(12) United States Patent
Kakuta et al.

(10) Patent No.: US 6,984,914 B2
(45) Date of Patent: Jan. 10, 2006

(54) MOTOR HAVING CHARACTERISTIC STRUCTURE IN ARMATURE AND DISC APPARATUS

(75) Inventors: Tsuyoshi Kakuta, Kurume (JP); Hirohiko Oowaki, Fukuoka (JP); Kensei Fukuda, Miyaki-gun (JP); Fuminobu Furukawa, Onojo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 365 days.

(21) Appl. No.: 10/012,043

(22) Filed: Dec. 11, 2001

(65) Prior Publication Data

US 2002/0084715 A1 Jul. 4, 2002

(30) Foreign Application Priority Data

| Dec. 28, 2000 | (JP) | ..... | 2000-400464 |
| Oct. 3, 2001 | (JP) | ..... | 2001-307268 |
| Oct. 5, 2001 | (JP) | ..... | 2001-309883 |

(51) Int. Cl.
*H02K 1/06* (2006.01)

(52) U.S. Cl. .......... 310/216; 310/254; 310/259; 310/164; 310/190; 310/218; 310/209

(58) Field of Classification Search ........... 310/254, 310/259, 216, 164, 190, 191–3, 218, 209
See application file for complete search history.

(56) References Cited

U.S. PATENT DOCUMENTS

| 3,588,888 | A | * | 6/1971 | Phillip | 310/49 R |
| 3,956,651 | A | * | 5/1976 | Brammerlo | 310/218 |
| 6,211,595 | B1 | * | 4/2001 | Nose | 310/216 |
| 6,344,703 | B1 | * | 2/2002 | Sawada | 310/90 |
| 6,617,746 | B1 | * | 9/2003 | Moslov | 310/254 |
| 6,700,271 | B2 | * | 3/2004 | Detela | 310/164 |

FOREIGN PATENT DOCUMENTS

| JP | 4934082 | 9/1974 |
| JP | 55074347 | 6/1980 |
| JP | 10257734 | 9/1998 |
| JP | 102711782 | 10/1998 |
| JP | 2000 245124 | 9/2000 |

* cited by examiner

*Primary Examiner*—Thanh Lam
*Assistant Examiner*—Iraj A. Mohandesi
(74) *Attorney, Agent, or Firm*—Stevens, Davis, Miller & Mosher, LLP

(57) ABSTRACT

The invention provides a motor which can reduce a generation of a cogging, has a thin size, and can generate a strong torque. In a motor having an armature including a back yoke formed in a cylindrical shape and a wound coil and a magnet formed in a cylindrical shape and magnetized by a plurality of magnetic poles on a cylindrical circumferential surface, the back yoke forms a convex portion protruding from the back yoke toward the magnet in a current switching portion of the coil. The invention further provided a disc apparatus using the motor mentioned above.

15 Claims, 23 Drawing Sheets

⇔ : SUCTION FORCE DUE TO MAGNET

MOTOR HAVING CHARACTERISTIC STRUCTURE IN ARMATURE AND DISC APPARATUS

BACKGROUND OF THE INVENTION

1. Field of the Invention

The present invention relates to a motor used for rotating a disc-like medium, particularly to a revolving-field type motor, and more particularly to a motor having a characteristic structure in an armature. Further, the present invention relates to a rotating apparatus of a disc-like medium using the motor mentioned above, for example, a disc apparatus.

2. Description of the Related Art

A revolving-field type motor of an outer rotor type is generally used for a motor used for rotating a disc-like medium due to a smooth rotation and a simple structure. Accordingly, a description will be given of a prior art on the basis of an exemplification of an outer rotor type motor.

In this case, the disc-like medium indicates a concentric disc-like medium having a center hole, and for example, means a medium such as a floppy disc, an MO, an MD, a PD, a CD (ROM, R and RW), DVD (ROM, R, RW and RAM) and the like as well as an old record (LP, EP and the like) disc. These mediums collectively means a disc simply in the following description. Further, since an object is to rotate the disc, the medium is called as the disc without relation to a matter whether or not the disc is received in a jacket.

At first, a description will be given below of a radial gap motor and an axial gap motor, as a conventional motor technique. FIG. 17 is a perspective view of a conventional radial gap motor, and FIG. 18 is a cross sectional view along a line X—X in FIG. 17. A description will be given of a structure of the conventional radial gap motor on the basis of the perspective view in FIG. 17 and the cross sectional view in FIG. 18.

Reference numeral 10 denotes a pole, which corresponds to a laminated iron core pole formed by laminating a plurality of silicon steel plates for preventing a eddy current. Reference numeral 46 denotes a coil, which is wound around the pole 10 and to which a driving current is applied. Reference numeral 61 denotes a magnet, which is arranged so as to oppose to the pole 10. Reference numeral 13 denotes a turn table on which the disc is mounted so as to rotate. Reference numeral 21 denotes a bearing, which holds a center shaft of the turn table 13. Reference numeral 15 denotes a chucking unit for mounting the disc to the turn table 13, which is generally structured such as to determine a center position of the disc by a chucking ball 16 so as to closely contact the disc with the turn table 13.

Next, FIG. 19 is a schematic view describing a rotating operation of the structure shown in FIG. 17. In FIG. 19, a magnet 61 of the radial gap motor is magnetized so that an S pole and an N pole are respectively distributed in an inner peripheral side and an outer peripheral side. When applying the driving current to the coil 46, the pole 10 is magnetized in accordance with a screw law. In the manner mentioned above, a repulsive force or a suction force is generated between a magnetic pole of the pole 10 and the magnet 61. In this case, the structure is made such as to alternately generate and switch the repulsive force and the suction force generated between the magnet 61 and the coil 46 as shown in FIG. 19 by controlling a current applied to a plurality of coils 46 and a timing thereof, thereby continuously generating a propelling force in a fixed direction and rotating the turn table 13 corresponding to a rotor magnet.

Next, a description will be given of a axial gap motor corresponding to another prior art. FIG. 20 is a perspective view of a conventional axial gap motor, FIG. 21 is a cross sectional view along a line Y—Y in FIG. 20, and FIG. 22 is a schematic view describing a rotating operation of the structure shown in FIG. 20. In the perspective view in FIG. 20 and the cross sectional view in FIG. 21, reference numeral 47 denotes a coil to which a driving current is applied. The structure is made such as to form a plurality of coils 47 on a printed circuit board and thereafter coating by an insulative material such as a resin or the like so as to be integrally formed on a coil circuit board 49. Reference numeral 62 denotes a magnet, which is arranged in parallel to the coil circuit board 49.

Reference numeral 51 denotes a ferromagnetic yoke mounted so as to be closely attached to the magnet 62. Reference numeral 34 denotes a turn table mounting the disc thereon so as to rotate, and reference numeral 22 denotes a bearing holding a center shaft of the turn table 34. Reference numeral 15 denotes a chucking unit, which determines a center position of the disc in the chucking ball 16 and closely attaches the disc to the turn table 34.

Next, a description will be given of a rotating operation of the axial gap motor on the basis of FIG. 22. As mentioned above, the magnet 62 is magnetized so that the S pole and the N pole are respectively distributed in the upper surface side and the lower surface side. Further, FIG. 23 is a view showing a magnetization distribution of the magnet. As shown in FIG. 23, the magnet 62 is magnetized so as to be separated into a plurality of areas in a circumferential direction. Then, since the magnet 62 is held between the turn table 34 and the yoke 51, as shown in FIG. 21, a magnetic flux is generated in an axial direction (a direction of a rotary shaft of the motor). Further, when applying the driving current to the coil 47, a magnetic flux due to the coil current is generated in accordance with a screw law.

In the manner mentioned above, the repulsive force or the suction force is generated between the magnetic flux due to the coil current and the magnet 62. In this case, by controlling the electric current applied to a plurality of coils 47 and the timing thereof, it is possible to alternately generate and switch the repulsive force and the suction force generated between the magnet 62 and the coil 47 as shown in FIG. 22 so as to continuously produce a propelling force in a fixed direction, thereby rotating the turn table 34 corresponding to the rotor magnet even in the axial gap motor in the same manner as that of the radial gap motor. Further, in both of the peripheral opposing case and the surface opposing case, the disc is rotated by the rotating turn table 34 so as to function as the disc apparatus.

There have been problems mentioned below in the conventional motors structured in the manner mentioned above. That is, the conventional radial gap motor has a motor operating principle of utilizing the magnetic suction force and the repulsive force between the N and S poles in the magnetic field system and the protruding pole of the armature (core) so as to rotate. That is, the suction and the repulsion are repeated during one cycle of the motor. This repeat inherently generates a torque change and an uneven torque. With respect to the uneven torque, an uneven torque portion with respect to a total torque is called as a cogging. On the basis of the operating principle mentioned above, it is normally considered that the radial gap motor can not avoid the cogging generated together with the rotation.

Further, in the conventional axial gap motor, since the structure is made such that the yoke, the coil circuit board and the rotor magnet are laminated in the axial direction, a limitation exists in making the structure thin. Further, due to the arrangement of the coil circuit board and the structure of the coil, it is disadvantageous in comparison with the motor having the peripheral opposing structure in view that the large torque is generated.

In particular, in the equipment using a compact disc, a motor having a more compact size and capable of generating a strong torque is required for the purpose of having a good use of the compact characteristic. The present invention is made by solving the problems mentioned above, and an object of the present invention is to provide a motor which can reduce a generation of a cogging, has a thin size, and can generate a strong torque.

SUMMARY OF THE INVENTION

The present invention is made by solving the problems mentioned above, and in accordance with the present invention, there is provided a motor comprising:

an armature having an armature yoke formed in a cylindrical shape and an armature coil wound around a cylindrical circumferential surface of the armature yoke; and a cylindrical magnetic field system formed in a cylindrical shape and magnetized by a plurality of magnetic poles on the cylindrical circumferential surface, wherein the armature yoke forms a convex portion protruding from the armature yoke toward the cylindrical magnetic field system in a current switching portion of the armature coil.

Further, there is provided a disc apparatus using the motor mentioned above.

By making the motor in the structure mentioned above, it is possible to provide a motor having a high efficiency with respect to an electric power consumption, having a reduced change of an electric current consumption and capable of making a size thin, and a disc apparatus.

DESCRIPTION OF THE PREFERRED EMBODIMENTS

A description will be given below of an embodiment in accordance with the present invention with reference to the accompanying drawings. A description will be given below of the present invention by exemplifying a spindle motor for driving a disc corresponding to one kind of motors capable of effectively utilizing the features of the present invention. In this case, it goes without saying that the embodiment used for the description does not limit the present invention to the usage of the spindle motor.

Embodiment 1

Figure 1:
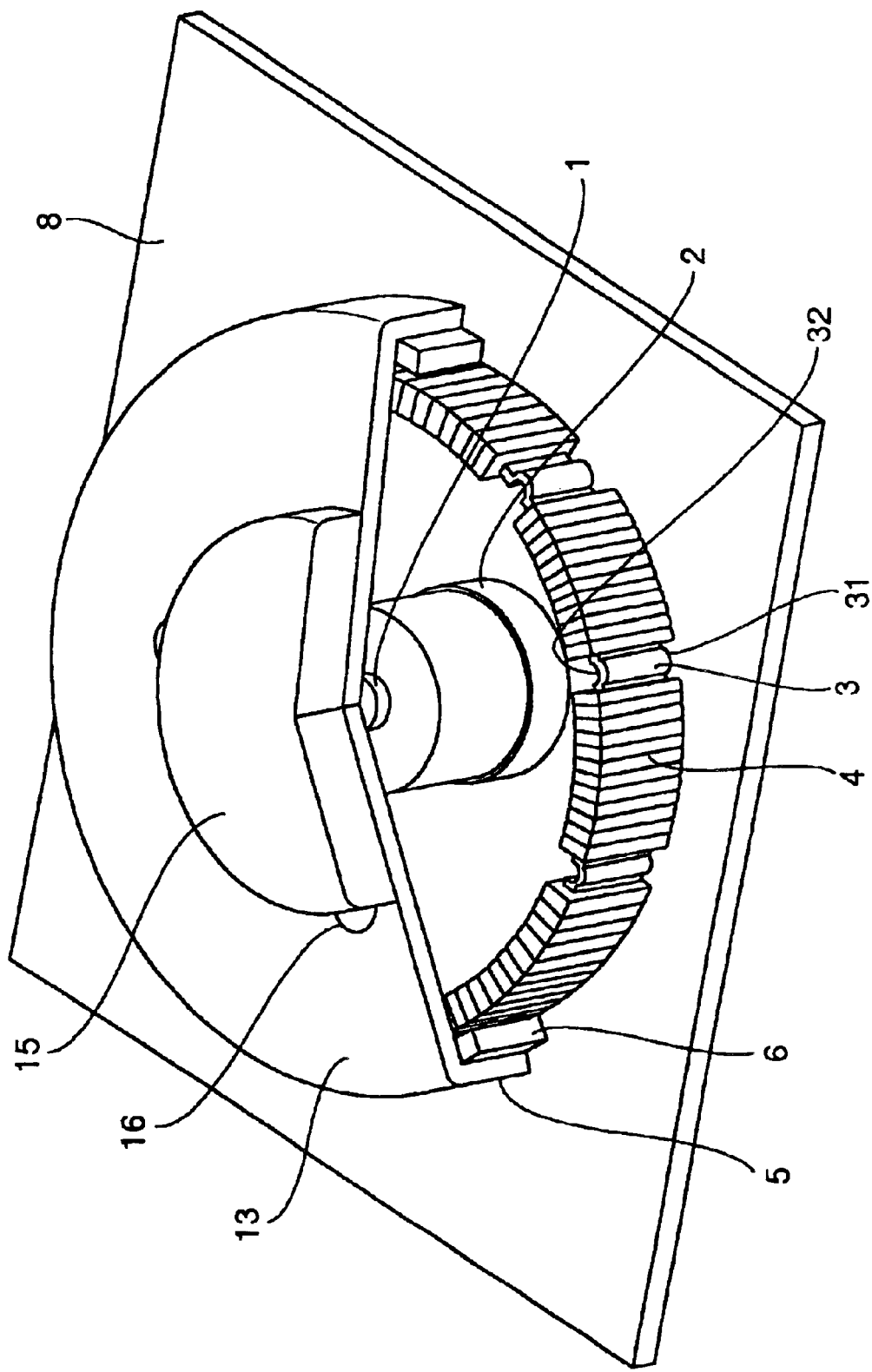
FIG. 1 is a perspective view of a motor in accordance with an embodiment of the present invention.

FIG. 1 is a perspective view of a motor in accordance with an embodiment of the present invention. In FIG. 1, reference numeral 1 denotes a rotary shaft of the motor. Reference numeral 2 denotes a bearing for the rotary shaft 1. Reference numeral 3 denotes a back yoke, which is concentrically arranged with respect to the rotary shaft 1 and formed in a cylindrical ring shape respectively provided with a convex portion 31 in a direction that a magnet 6 exists (in an outer peripheral portion of the back yoke 3 in the present embodiment) and with a recess portion 32 in a direction that the magnet 6 does not exist (in an inner peripheral portion of the back yoke 3 corresponding to a back surface of the convex portion 31, in the present embodiment), by using a magnetic material. Reference numeral 4 denotes a coil wound around the back yoke 3.

Reference numeral 5 denotes a yoke, and reference numeral 6 denotes a magnet. The magnet 6 is closely attached to and sucked in the yoke 5, thereby holding the magnet 6, and a flat surface in a radial direction has a function of a turn table 13. In this case, since a chucking unit 15 and a chucking ball 16 which are provided on the turn table 13 are the same as those described in the prior art, the same names and the same reference numerals are attached thereto and an overlapping description will be omitted.

The magnet 6 is structured in a cylindrical shape, and a plurality of N and S poles are alternately magnetized in a circumferential direction of the cylindrical peripheral surface. The magnet 6 and the back yoke 3 around which the coil 4 is wound are concentrically arranged with respect to the rotary shaft 1 with keeping a predetermined interval therebetween. Reference numeral 8 denotes a motor base, to which the bearing 2 and the back yoke 3 are fixed.

Figure 2:
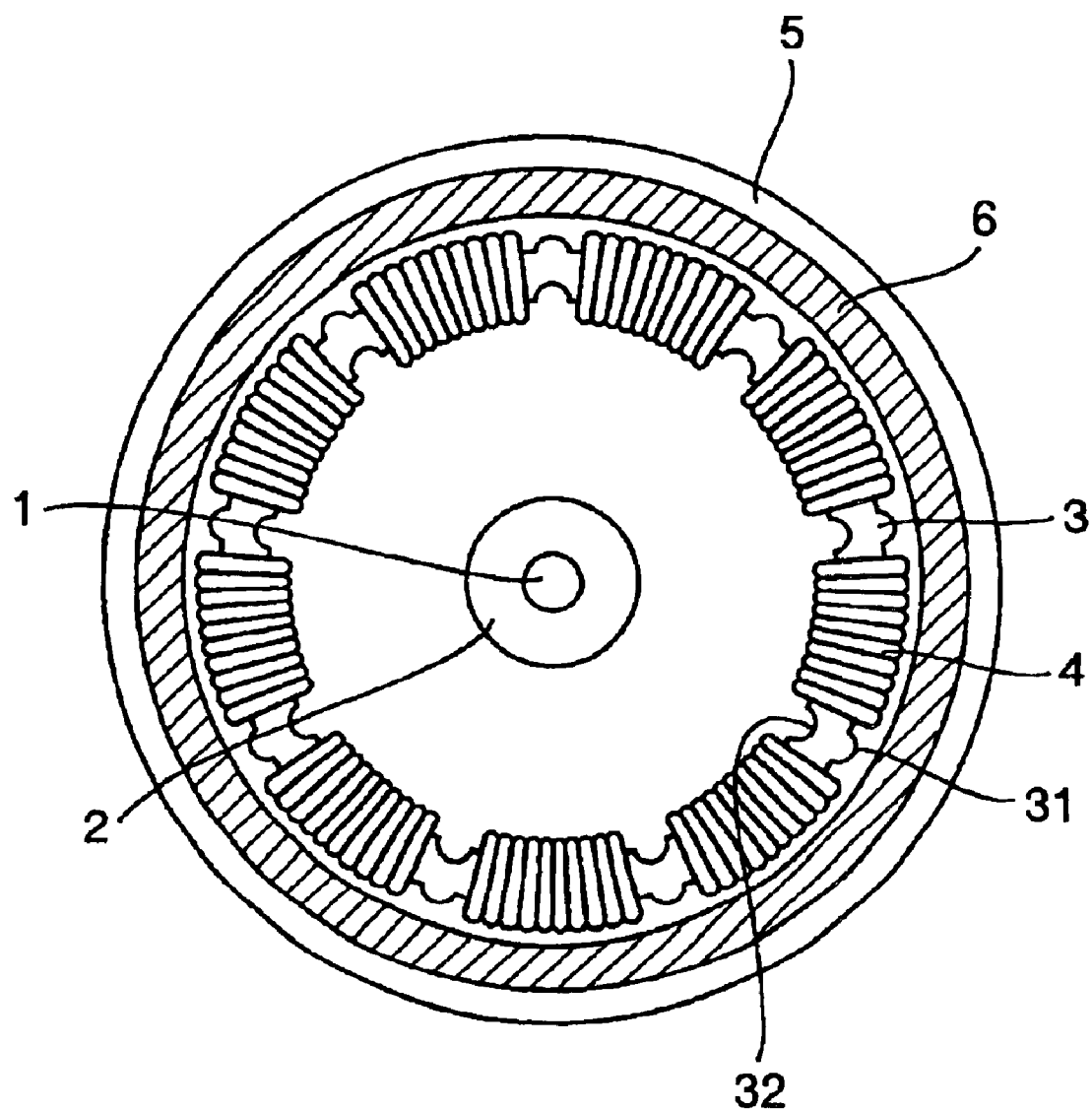
FIG. 2 is a schematic view showing a connection between adjacent coils.

Next, a description will be given in detail of an armature (a stator) portion corresponding to a feature of the present invention. FIG. 2 is a plan view of a main portion in FIG. 1. In FIG. 2, the armature portion is constituted by the back yoke 3 and the coil 4. At first, the back yoke 3 is formed by a magnetic material constituted by a ferromagnetic material having a high magnetic permeability. In particular, on a peripheral surface thereof, it is formed in a cylindrical ring shape in which the convex portion 31 is formed in the direction that the magnet 6 exists (on the outer peripheral portion of the back yoke 3 in the present embodiment), and the recess portion 32 is formed in the direction that the magnet 6 does not exist (on the inner peripheral portion of the back yoke 3 in the present embodiment). A magnetic material which is easily worked and acquired is generally used, and a carbon steel, a magnetic steel and a silicon steel are generally employed for the material. The back yoke 3 may be formed in a cylindrical shape. Since an alternating magnetic flux is applied to the back yoke 3, a ferromagnetic material formed in a thin plate shape may be used in a laminated state for the purpose of reducing an eddy current loss. Further, a sintered material capable of being easily shaped may be used as the back yoke material with taking an economic efficiency at a mass production into consideration. In this case, a ferritic sintered material or the like is preferably employed.

Figure 3:
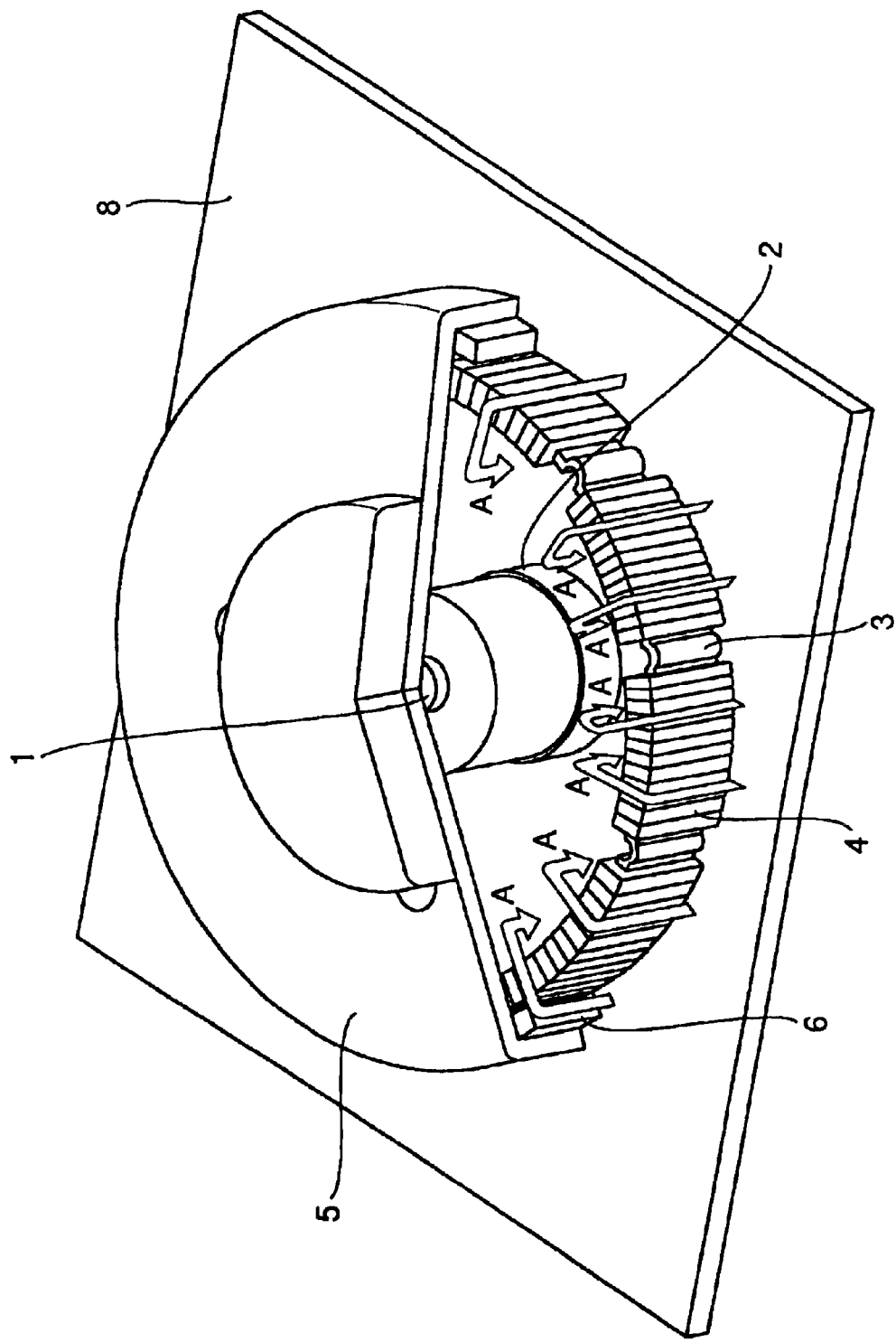
FIG. 3 is a schematic view describing a method of winding the coil in FIG. 1.

Next, a description will be given of a method of winding the coil 4 around the back yoke 3 in accordance with a first feature of the present invention. FIG. 3 is a view describing a method of winding the coil shown in FIG. 1. In this case, as a matter of convenience, the description is given of a motor constituted by eighteen coils 4 and twelve poles of magnets 6. In FIG. 3, all of eighteen coils 4 are wound around the back yoke 3 in the same A direction, whereby a winding process is made simple. (It is possible to wind all of the coils in the reverse direction to the A direction.) In this case, since the coil 4 is a minimum constitutional unit, it is called a unit coil 41 for short in order to make the later description easy.

Figure 4:
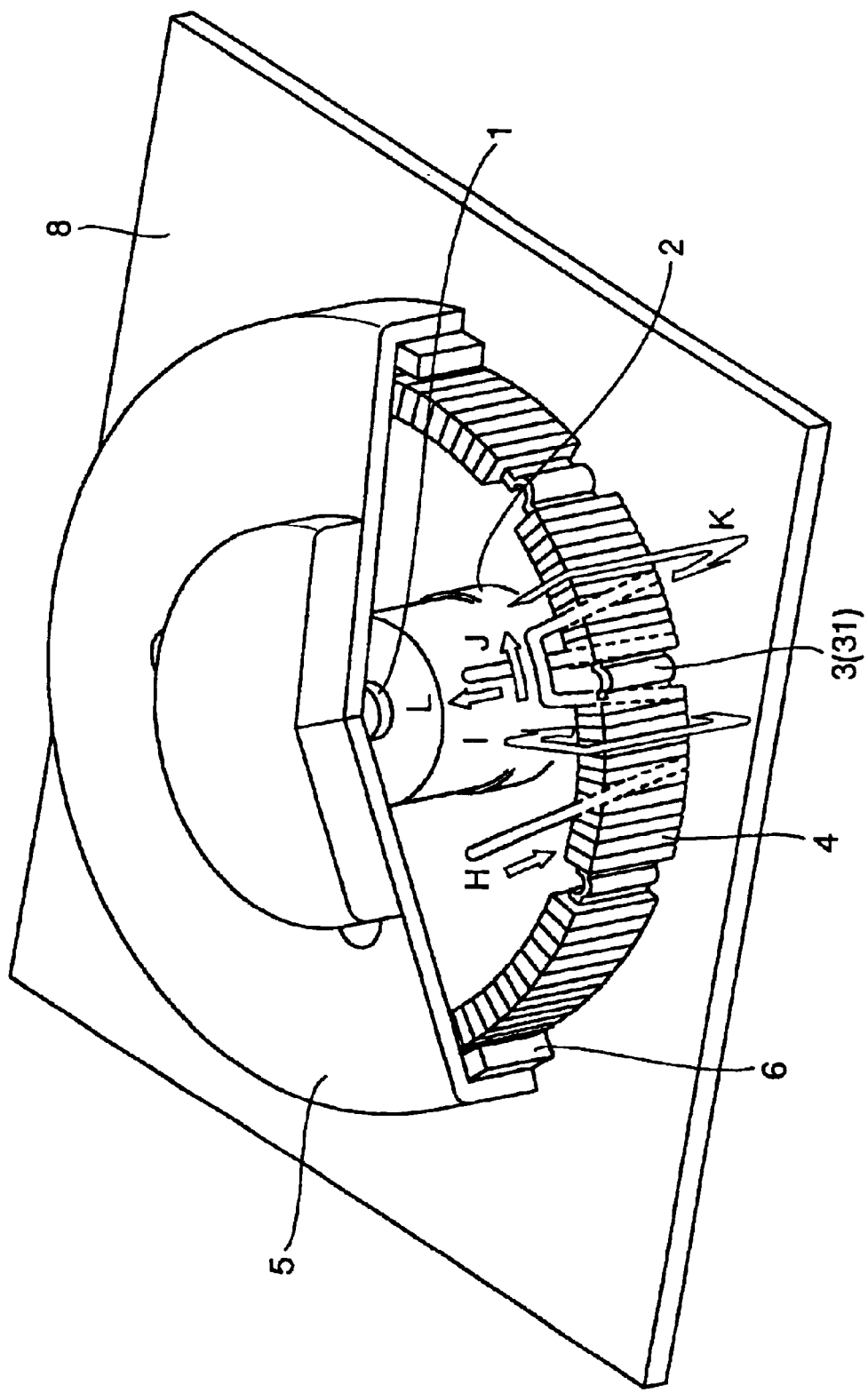
FIG. 4 is a schematic view describing a connection of the coil in FIG. 1.
Figure 5:
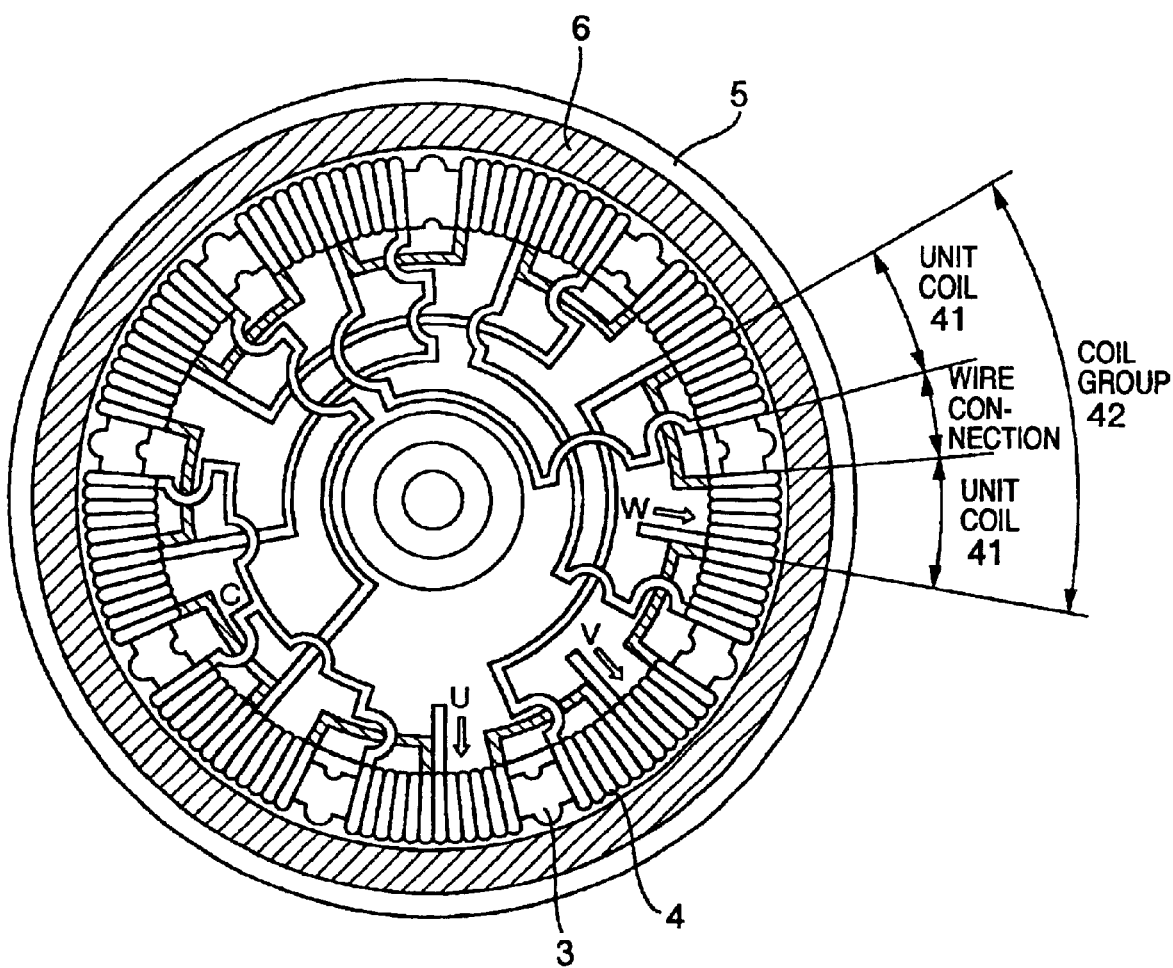
FIG. 5 is a schematic view of a connection of all the coils in FIG. 1.

Further, FIG. 4 is a view describing a coil connection in FIG. 1, and FIG. 5 is a view showing a connection of all the coils in FIG. 1. Adjacent two unit coils 41 are connected so that an end of winding in one unit coil and an end of winding in another unit coil are connected. Accordingly, the wire connection is executed so that an electric current applied to a beginning of winding in one unit coil 41 from an H direction flows in an I direction from a downward direction of the unit coil 41 to an upward direction, flows from the end of winding in one unit coil to the end of winding in the adjacent unit coil 41 in a J direction, flows from the end of winding in the unit coil 41 to the beginning of winding in a K direction from the upward direction to the downward direction, and flows in an L direction from the beginning of winding in the unit coil 41. Accordingly, nine coils are formed by connecting the adjacent coils 41. These connected adjacent unit coils 41 are called a coil group 42 for short in order to make the later description easy.

In FIGS. 2 and 5, these nine coil groups 42 are mounted so that connected center portions respectively ride astride the recess portions 32 and the convex portions 31 provided in the back yoke 3. That is, in FIGS. 4 and 5, an electric current applied to the unit coil 41 flows in an opposite direction to each other with respect to the convex portion 31.

That is, an electric current switching portion of the coil group 42 is positioned at the convex portion 31. Further, the unit coil 41 is wound around the back yoke 3 regularly so as to be closely attached thereto with no space between the coils. Accordingly, the coil 4 is not arranged in an area of the convex portion 31 and the recess portion 32, and the coil 4 is wound regularly around the cylindrical portion of the back yoke 3 in which the convex portion 31 and the recess potion 32 do not exist.

In FIG. 5, connected nine coil groups 42 are respectively connected to the beginning of winding in the coil groups 42 two adjacent thereto (that is, third coils) in series. Accordingly, nine coil groups 42 are made up three parallel circuits obtained by connecting three coil groups 42 in series. That is, three-phase armature coils are formed. All of terminals of ends of winding in the respective series connections are connected so as to form a COM terminal (illustrated by reference symbol C in the drawing), thereby connecting to a common power source (for example, 0 V) of all the circuit. The terminals of the beginnings of winding in the respective series connections are connected respective phase (illustrated by reference symbols U, V and W in the drawing) power source in the three phases. In this case, the circuit structure shown in FIG. 5 is exemplified for the purpose of describing a base structure, and does not limit the present invention to the contents mentioned above, so that for example, the number of the coil groups 42 connected in series may be one circuit or may be four circuits or more. Further, the number of the parallel circuits is not limited to three phases, but may be six phases.

Figure 6:
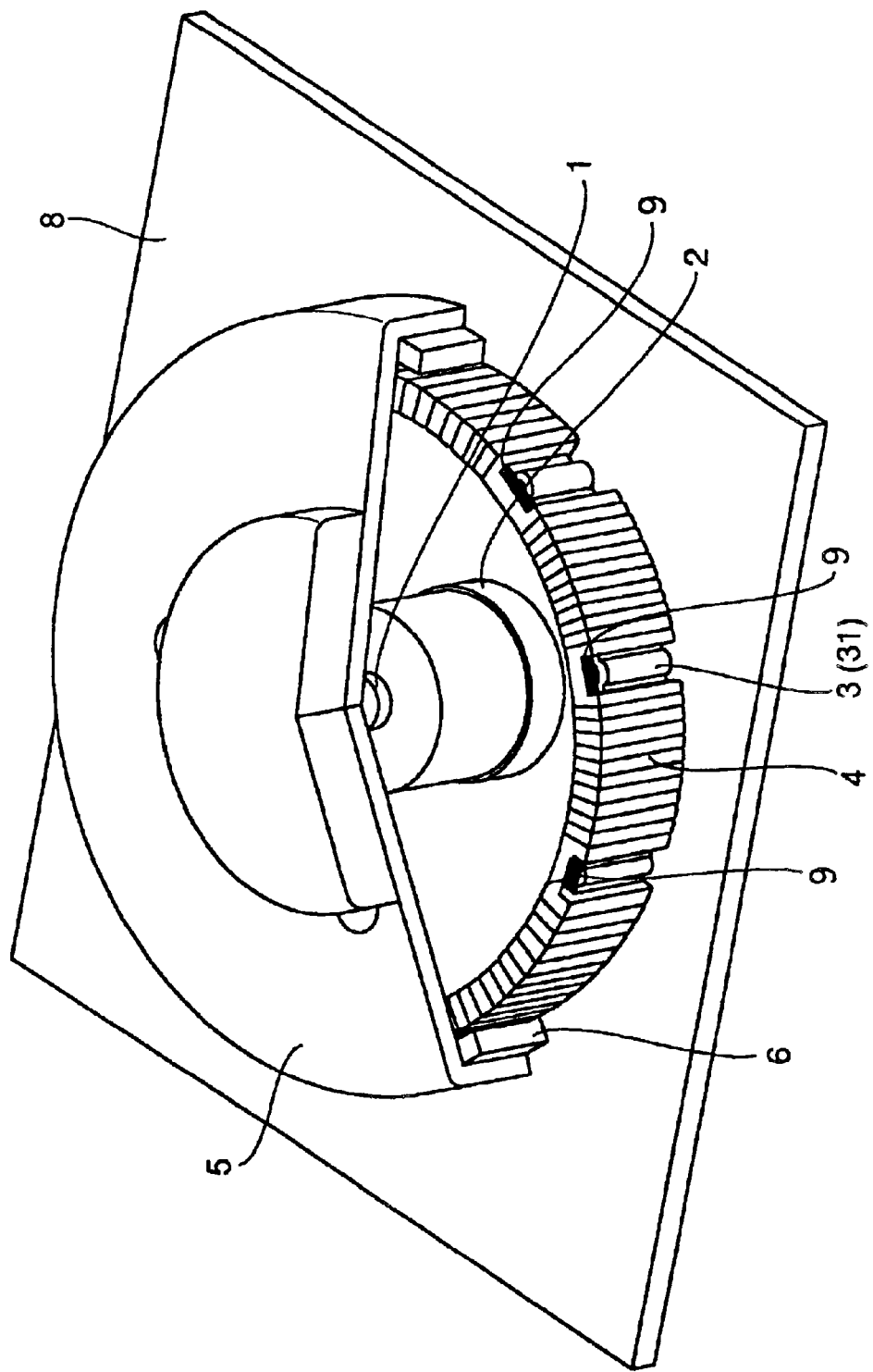
FIG. 6 is a perspective view of a motor having another coil.
Figure 7:
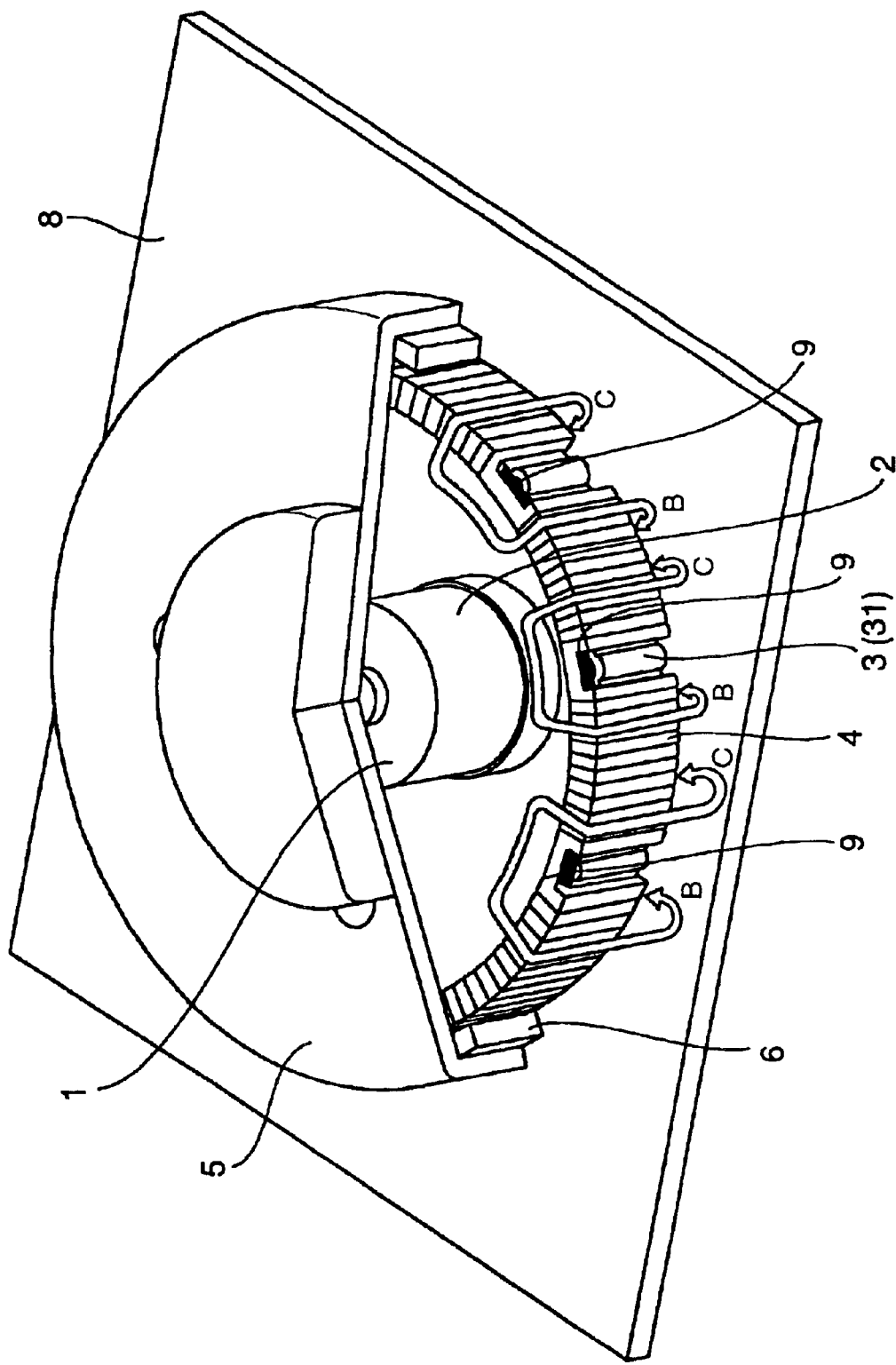
FIG. 7 is a schematic view describing a connection between the adjacent coils.

FIG. 6 is a perspective view of a motor having another coil, and FIG. 7 is a view describing a connection between adjacent coils in FIG. 6. Further, these drawings describe a coil winding method intending to make the winding step of the coil 4 simple. In FIGS. 6 and 7, a coil hook 9 holding a center portion of the coil is provided in the convex portion 31 of the back yoke 3, and the coil center portion is engaged with the coil hook 9. Next, both end portions of the coil 4 are wound around the back yoke 3 so as to rotate in a B direction and a C direction. That is, the coil center portion is fixed and both ends of the coil are wound around so as to rotate in the same direction with respect to the back yoke 3. The coil is wound in the same direction, however, since the coil center portion is folded back, right and left unit coils 41 are wound around the back yoke 3 so as to be reverse rotated. In the manner mentioned above, nine coils are prepared. In accordance with the present coil winding method, the coil 4 corresponds to the coil group 42 mentioned above, and a section obtained by dividing the coil 4 into two from the center portion corresponds to the unit coil 41 mentioned above. That is, the coil 4 corresponds to the coil group 43 having the coil center portion, and has the unit coil 41 reverse wound with respect to each other.

Figure 8:
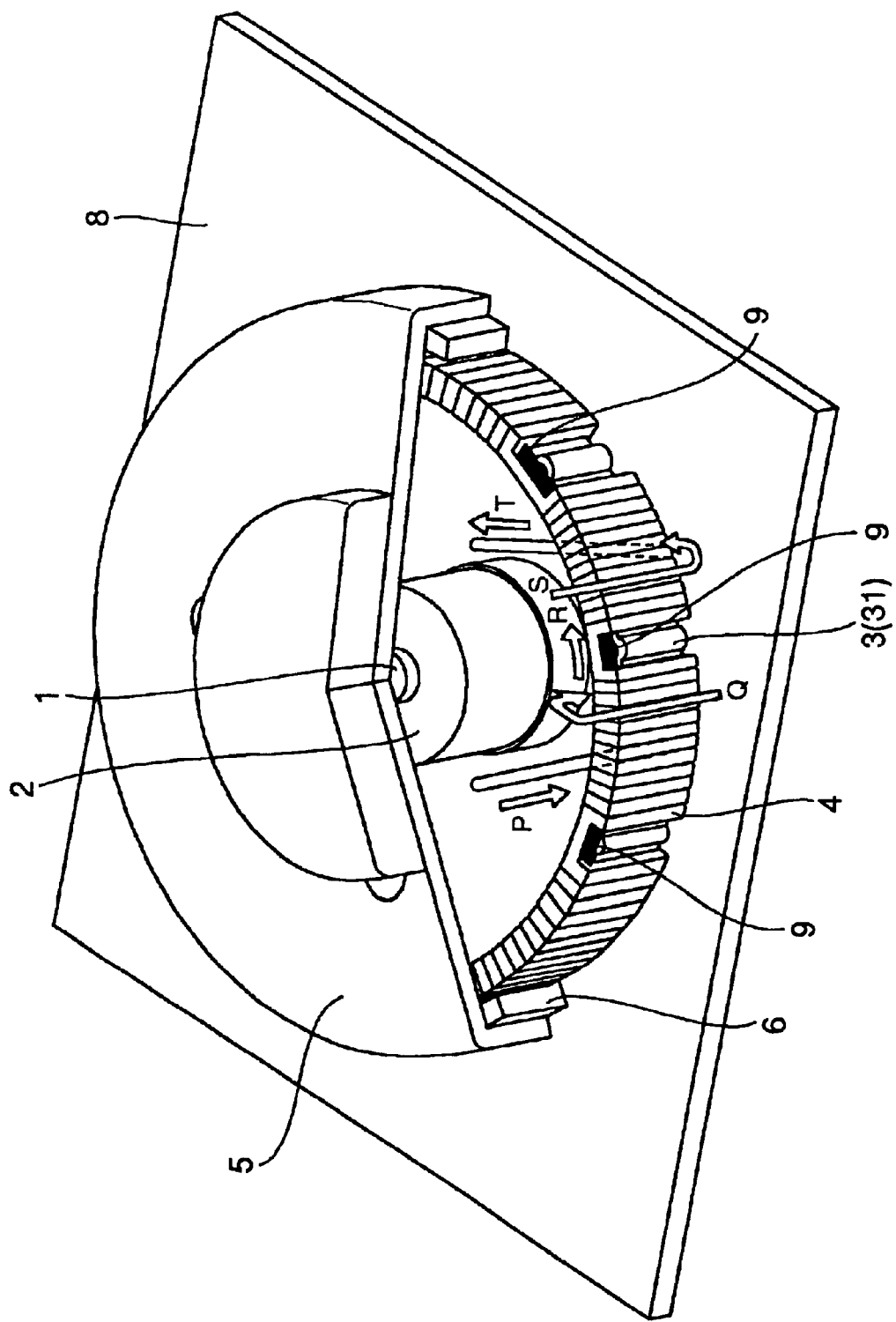
FIG. 8 is a schematic view describing a coil current in FIG. 6.

FIG. 8 is a view describing a coil current shown in FIG. 6. When applying an electric current to the wound coil group 43, the electric current applied from a P direction flows in a Q direction corresponding to an upward direction from a downward direction of the coil, flows through the coil center portion in an R direction, flows from the upward direction to an S direction corresponding to the downward direction and finally flows out in a T direction. Each of nine coil groups 43 is mounted so that the coil center portion rides astride the recess portion 32 and the convex portion 31 provided in the back yoke 3. Further, the unit coil 41 is wound around the back yoke 3 regularly so as to be closely attached thereto with no space between the coils. In accordance with another winding method shown in FIG. 6, in the same manner as that in FIGS. 4 and 5, the electric current flowing through the coil 41 flows in an opposite direction to each other with respect to the convex portion 31. That is, the electric current switching portion of the coil group 43 is positioned in the convex portion 31.

Figure 9:
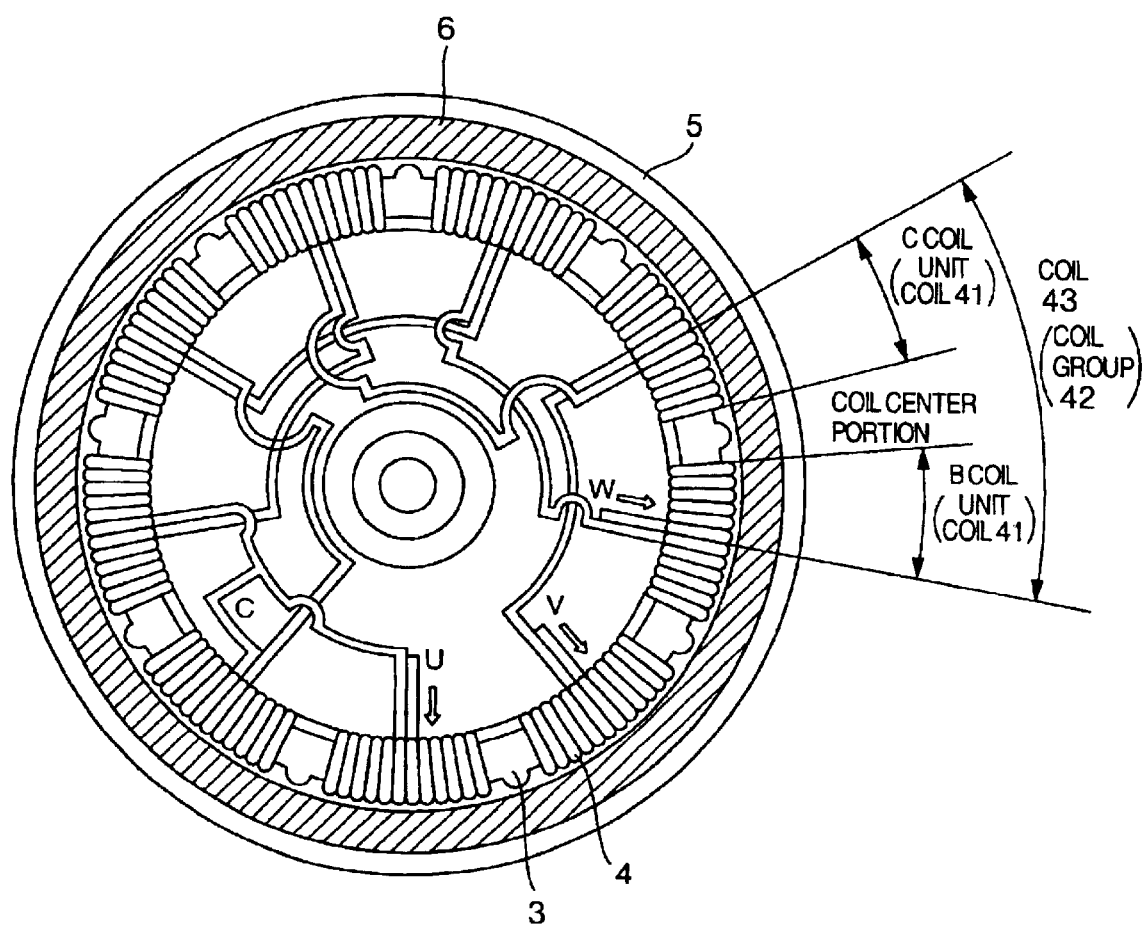
FIG. 9 is a schematic view of a connection of all the coil in FIG. 6.

FIG. 9 is a view showing a connection of all the coils in FIG. 6. In FIG. 9, connected nine coil groups 43 are respectively connected to the beginning of winding in the coil groups 43 two adjacent thereto (that is, third coils) in series. Accordingly, nine coil groups 43 are made up three parallel circuits obtained by connecting three coil groups 43 in series. That is, three-phase armature coils are formed. All of terminals of ends of winding in the respective series connections are connected so as to form a COM terminal (illustrated by reference symbol C in the drawing), thereby connecting to a common power source (for example, 0 V) of all the circuit. The terminals of the beginnings of winding in the respective series connections are connected respective phase (illustrated by reference symbols U, V and W in the drawing) power source in the three phases. In this case, the circuit structure shown in FIG. 9 is exemplified for the purpose of describing a base structure, and does not limit the present invention to the contents mentioned above, so that for example, the number of the coil groups 43 connected in series may be one circuit or may be four circuits or more. Further, the number of the parallel circuits is not limited to three phases, but may be six phases.

Figure 10:
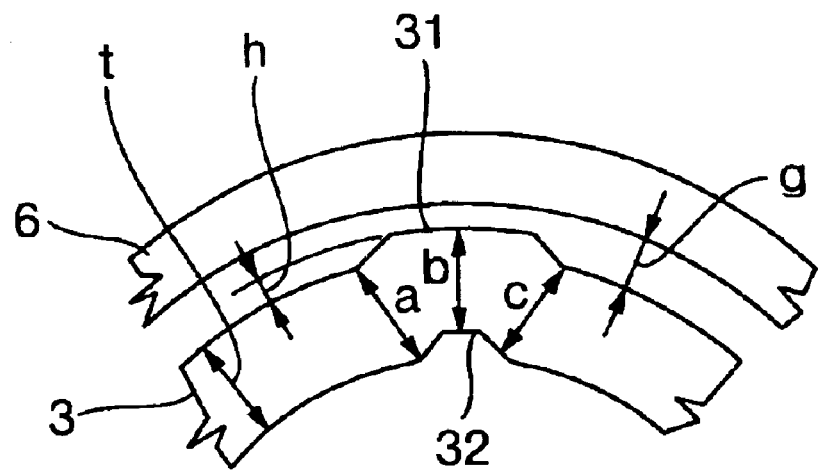
FIG. 10 is a schematic view describing details of a convex portion in FIG. 1.
Figure 10:
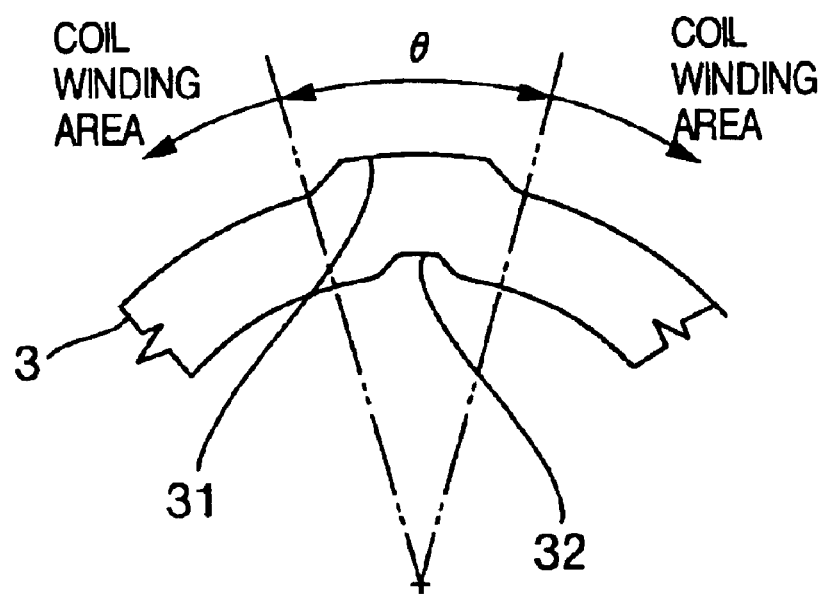

Next, a description will be given of a convex portion corresponding to a second feature of the present invention. FIG. 10 is a view describing details of the convex portion in FIG. 1. FIG. 10(a) is a partly enlarged view of the convex portion. In the drawing, a thickness of the back yoke 3 is set to a yoke thickness t. Further, with respect to the convex portion 31, shoulder portions against the recess portion 32 are set to shoulder portion yoke thickness a and c, and a thickness between the convex portion 31 and the recess portion 32 is set to b. Further, an amount of protrusion of the convex portion 31 from the cylindrical peripheral surface portion of the back yoke 3 is set to a convex portion height h. A gap length between the cylindrical peripheral surface portion of the back yoke 3 and the magnet 6 is set to g.

At first, the yoke thickness t is set so as to secure a sufficient magnetic flux density, prevent an eddy current loss and reduce a resistance loss of the coil 4. In order to satisfy the former two conditions, it is necessary to increase t, and in order to satisfy the latter, it is necessary to reduce t. In a spindle motor of a disc apparatus to which the present invention is applied, it is possible to obtain a motor having a preferable low loss performance by setting the yoke thickness t to a range $1.2 \leq t \leq 2.0$ (mm).

As in detail described in a magnetic circuit mentioned below, the magnetic flux is formed in a beam shape by the convex portion 31. Further, at the same time, it is necessary that a cross sectional area of the magnetic circuit maintains the same cross sectional area as that of the cylindrical peripheral surface portion of the back yoke 3, thereby preventing a magnetic saturation from being generated. Accordingly, it is necessary to maintain a relation a, b and $c \geq t$. In particular, it is important to secure the shoulder yoke thickness a and c in a process of working the back yoke 3.

Next, the convex portion height h is set by an effect obtained by narrowing the magnetic flux in a beam shape and a range of an allowable cogging. In the spindle motor of the disc apparatus to which the present invention is applied, it is possible to obtain a motor having a required high torque and low cogging performance by setting the convex portion height h to a range $0.1 \leq h \leq 0.5$ (mm).

Further, FIG. 10(b) is a view describing a convex portion angle. θ shows a convex portion angle, that is, an angle at which one convex portion 31 occupies in all the periphery of the back yoke 3. As mentioned above, since the coil 4 is wound around the cylindrical portion of the back yoke 3 regularly, and the unit coil 41 is arranged so as to ride astride the convex portion 31, the convex portion 31 corresponds to an area in which the coil does not exist. Accordingly, the area of the convex portion 31 becomes an important element for forming the magnetic flux in a beam shape. Above all things, in the spindle motor for the disc apparatus in which the diameter of the turn table is 29 mm, when constructing the three-phase armature coil by three coil groups and constructing the magnet 6 by twelve poles (refer to FIG. 13 mentioned below), it is possible to obtain a motor having a required high torque and low cogging performance in a range $\theta = 5 \pm 0.5$ degrees. Further, when changing the number of the coil group structure to two or four, and setting the number of the poles in the magnet 6 to eight or sixteen in a corresponding manner so as to change the diameter of the motor in correspondence to the number of the poles, it is possible to obtain 2 degrees and 8 degrees for the θ. That is, it is possible to obtain an optimum condition range $2 \leq \theta \leq 8$ (degrees).

Figure 11:
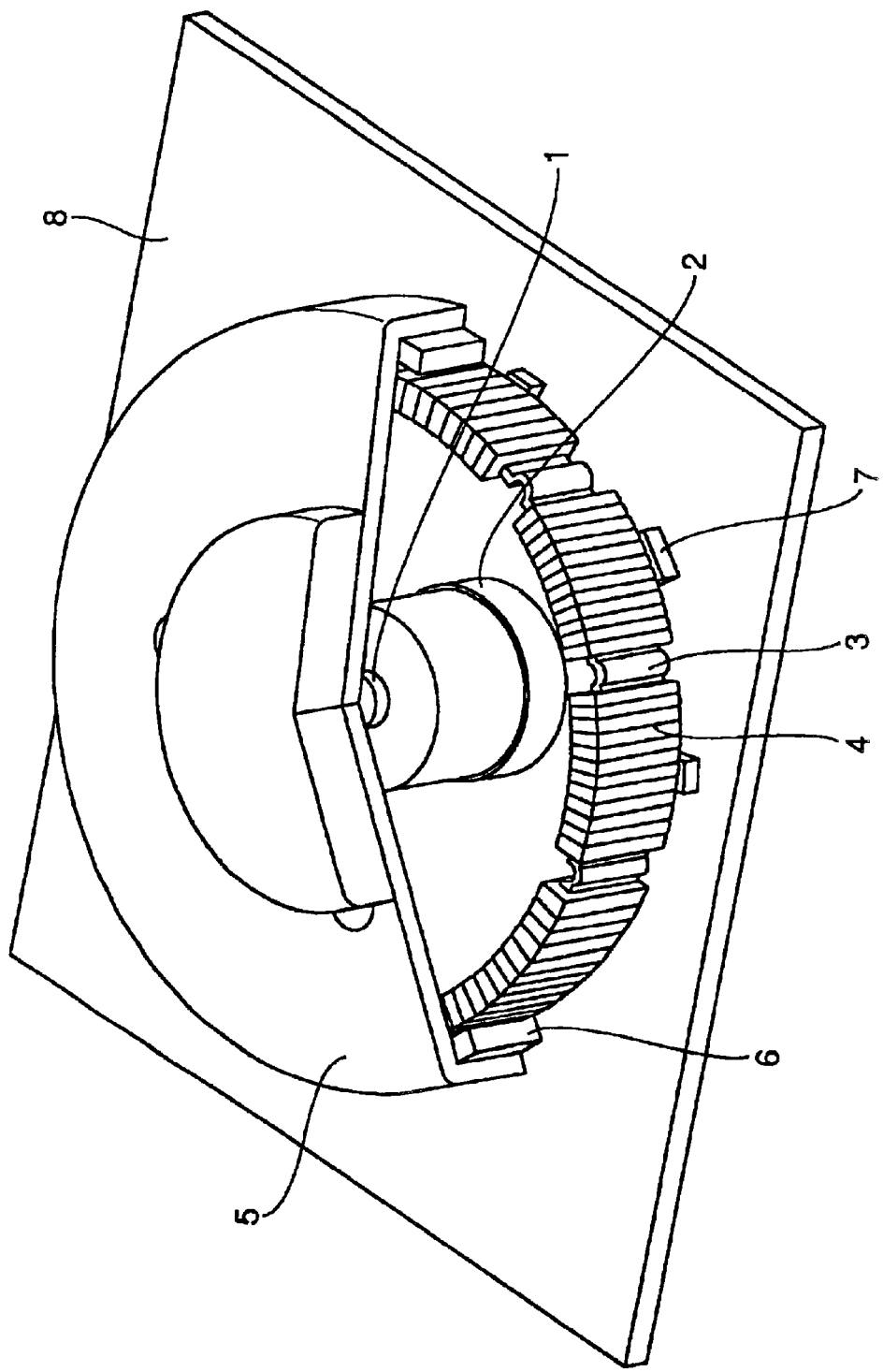
FIG. 11 is a perspective view of a motor using a magnetic sensor.

Next, in order to control the rotation of the motor, a means for sensing a rotational state (a change of the magnetic flux during the rotation, a rotational number or the like) is required. As the sensing means therefor, for example, a plurality of magnetic sensors 7 such as hole elements or the like are mounted at a plurality of portions, thereby sensing a rotational state of the motor so as to execute a feed back control. FIG. 11 is a perspective view of a motor using a magnetic sensor. Reference numeral 7 denotes a magnetic sensor corresponding to the sensing means. The magnetic sensor 7 is arranged in a gap between the magnet 6 corresponding to the magnetic field system portion and a lower portion of the motor base 8. The change of the magnetic field system is detected by the magnetic sensor 7 by utilizing a leakage flux from the magnet 6. A driving current of the coil group 42 (42, 43) is controlled on the basis of the detected result. Since the magnetic sensor 7 is arranged in the gap between the magnet 6 and the lower portion of the motor base 8, it is not necessary to widen the magnetic gap or give a change to the magnetic gap length. Accordingly, it is possible to accurately maintain an air gap between the magnetic field system portion and the coil group 42 (42, 43) within a narrow range.

Next, a description will be given of the magnetic field system portion. The magnet 6 forms a ferromagnetic material in a cylindrical shape. The cylindrical peripheral surface portion opposing to the back yoke 3 is precisely worked with a high accuracy of an outer diameter and a roundness. Accordingly, the cylindrical peripheral surface portion is formed in a smooth and continuous peripheral surface. The cylindrical peripheral surface portion of the magnet 6 is magnetized by a plurality of poles in the order N, S, N, S, ... in a circumferential direction, and the yoke 5 is fixed and held on the outer peripheral surface of the magnet 6. The yoke 5 functions as a yoke for increasing a gap magnetic flux density between the magnet 6 and the back yoke 3.

Figure 12:
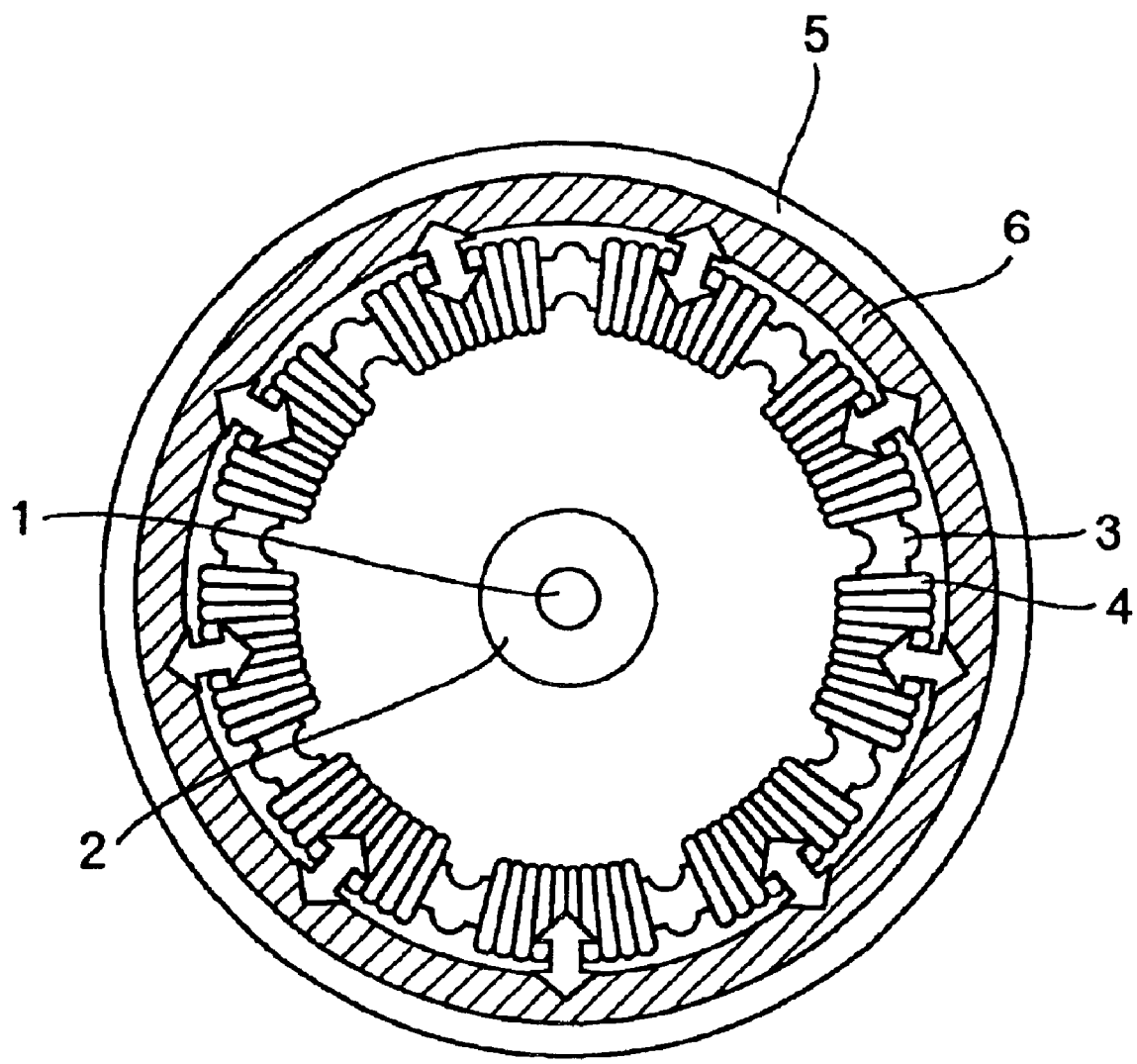
FIG. 12 is a schematic view describing a suction force between a magnet and a back yoke.

Further, a description will be given of an arrangement of the back yoke 3 around which the magnet 6 and the coil group 42 (42, 43) are wound. FIG. 12 is a view describing a suction force between the magnet and the back yoke. The suction force caused by the magnet 6 is generated between the magnet 6 and the back yoke 3. When reducing a distance between the magnet 6 and the back yoke 3, it is necessary to generate greater torque for rotating the motor in order to overcome the suction force between the magnet 6 and the back yoke 3. Further, on the contrary, when increasing the distance between the magnet 6 and the back yoke 3 in order to reduce the suction force between the magnet 6 and the back yoke 3, a magnetic flux coming across the coil 4 is reduced and the generated torque is also reduced. Accordingly, the gap (the gap length g) between the magnet 6 and the back yoke 3 is set to an optimum positional relation which can minimize the suction force applied to a portion between the magnet 6 and the back yoke 3, increase the number of magnetic flux coming across the coil 4 as much as possible and maximize the generation of torque.

Again, in FIG. 10(*a*), reference symbol g denotes a gap length. When making the back yoke 3 and the magnet 6 of the material mentioned at the outset, it is possible to obtain a motor having a required high torque and low cogging performance in a range $1.0 \leq g \leq 1.5$ (mm).

Figure 13:
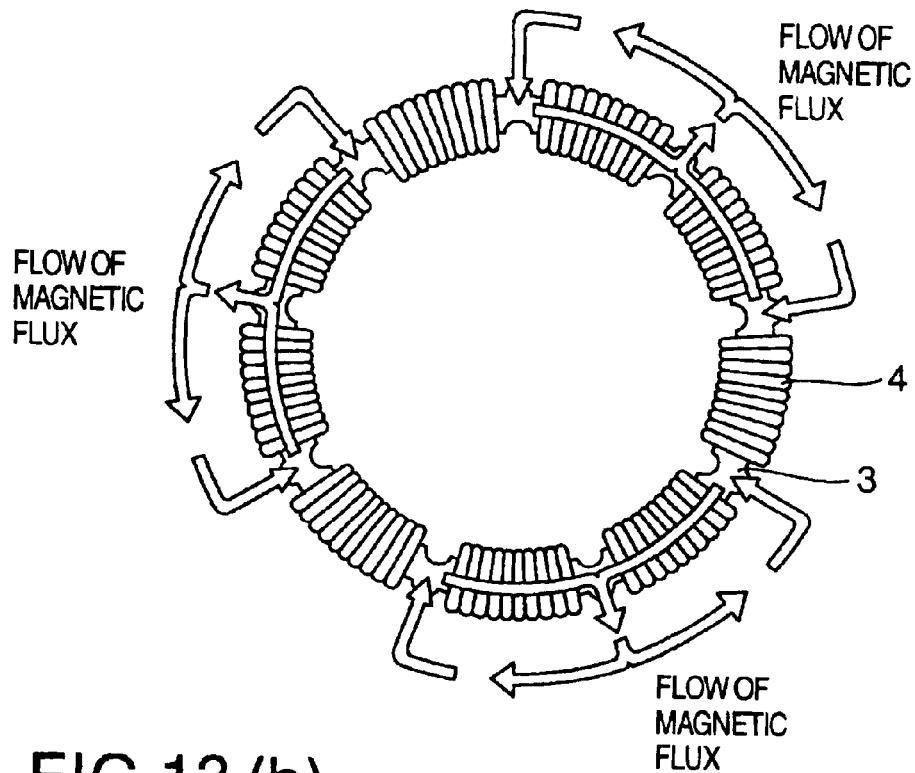
FIG. 13 is a schematic view describing a magnetic circuit of a motor in accordance with an embodiment of the present invention.
Figure 13:
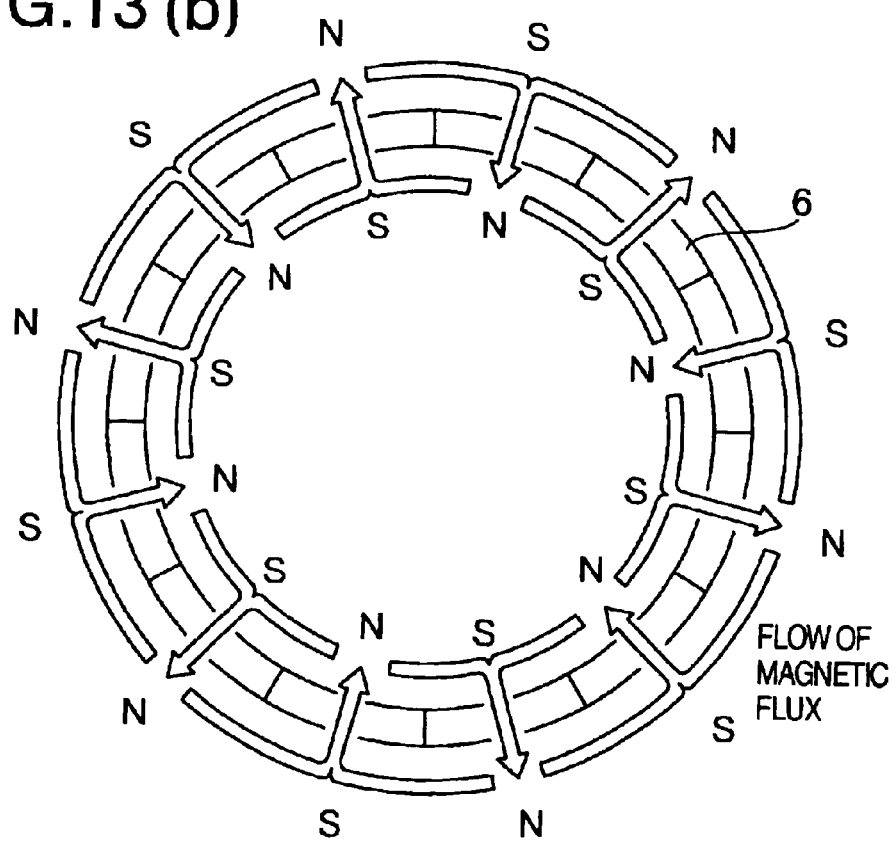

Next, a description will be given of a rotational operation of the motor in accordance with the present invention. FIG. 13 is a view describing a magnetic circuit of the motor in accordance with the embodiment of the present invention, in which FIG. 13(*a*) describes the magnetic flux of the back yoke 3, and FIG. 13(*b*) describes the magnetic flux of the magnet 6. In FIGS. 13(*a*) and 13(*b*) (refer to FIGS. 5 and 9), a rotating force is generated as a direct current motor in accordance with a Fleming's left hand rule. The coil 4 (the coil group 42) is arranged in the magnetic flux between the magnet 6 and the back yoke 3. When the electric current is applied to the coil 4 of the coil group 42, an electromagnetic force is applied to the coil 4 on the basis of the Fleming's left hand rule. That is, since a component in the axial direction (the same direction as that of the motor shaft) of the electric current flowing through a copper wire of the coil 4 comes across the magnetic flux with respect to the magnetic flux (in the radial direction) passing from the magnet 6 toward the back yoke 3, the electromagnetic force is generated in a normal direction of the coil 4, that is, a rotational direction thereof.

Further, when applying the electric current to the coil 4, a stream of the magnetic flux is generated within the back yoke 3. The magnetic flux generated within the back yoke 3 is overlapped with the magnetic flux generated from the magnet 6 in a vector direction (refer to an arrow in FIG. 13). As a result, the magnetic flux coming across the coil 4 is further intensified so as to generate a greater torque. In particular, since the convex portion 31 is formed in the back yoke 3 in accordance with the present invention, and the electric current switching portion of the coil 4 (refer to the connecting point of the unit coil 41, the center portion and the middle portion 43 mentioned above) is arranged in the convex portion 31, the magnetic flux is narrowed in a beam shape between the convex portion 31 and the magnet 6, so that there is an effect that the magnetic flux is intensified.

Since the actual armature portion exists in a fixed side, the magnetic flux system portion, that is, the magnet 6 and the yoke 5 rotate due to a reaction. Accordingly, the structure becomes of a revolving-field type. A rotating force is successively generated by sequentially controlling the orientation and the timing of the electric current applied to the coil 4 on the basis of the positional relation between the coil 4 and the magnet 6 by using the signal of the magnetic sensor 7, whereby the motor continuously rotates.

Figure 14:
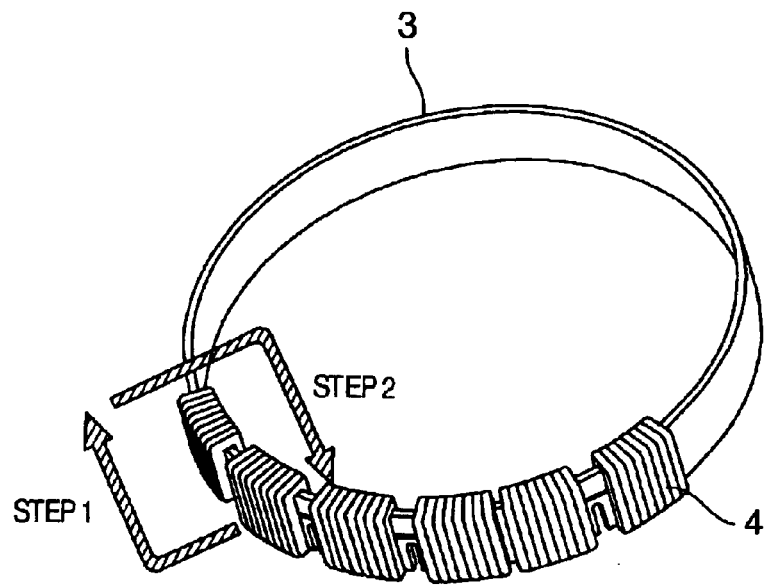
FIG. 14 is a schematic view of a coil winding process.
Figure 14:
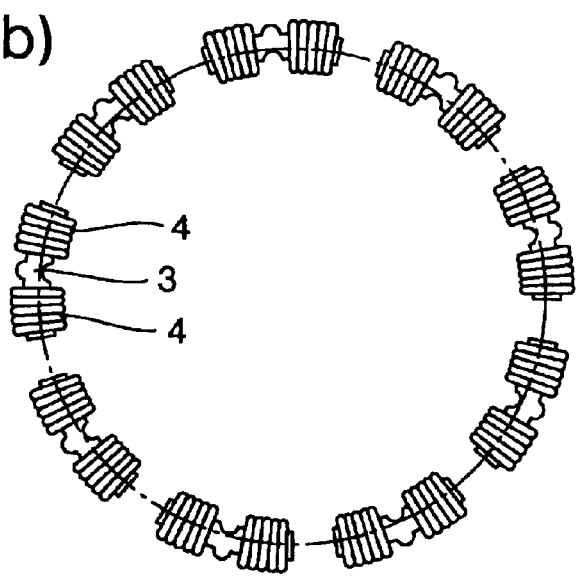
Figure 14:
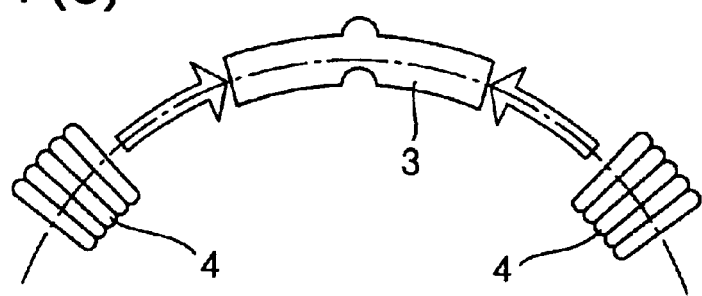

Next, a description will be given of a winding process of the coil 9. FIG. 14 is a view describing the coil winding process. FIG. 14(*a*) is a view describing the coil winding process using the back yoke 3 shown in FIG. 1. In FIG. 14(*a*), the coil 4 is applied to the ring-like back yoke 3 shown in FIG. 1 and is received after being inserted from the lower portion of the back yoke 3 (a step 1), and the coil 4 is received in the upper portion of the back yoke 3 and wound around the back yoke 3 (a step 2), whereby the coil winding process is executed.

Next, in order to make the winding process of the coil 4 easy, all the periphery of the ring-like back yoke 3 is separated into a plurality of numbers. For example, as shown in FIG. 14(*b*), all the periphery is separated into nine sections (corresponding to a number of the coil groups 42) in a peripheral direction, and the coil 4 is wound around the separated back yoke 3. A plurality of back yokes 3 around which the coil 4 is wound are bonded by means such as a welding or the like so as to form the ring-like back yoke 3. That is, as shown in FIG. 14(*b*), it is possible to rotate the coil 4 while feeding the back yoke 3 so as to wind around the back yoke. Otherwise, in FIG. 14(*c*), it is possible to previously wind and form the unit coil 41 and attach the coil 4 around the separated back yokes 3. In the manner mentioned above, it is possible to make the coil winding process easy.

Figure 15:
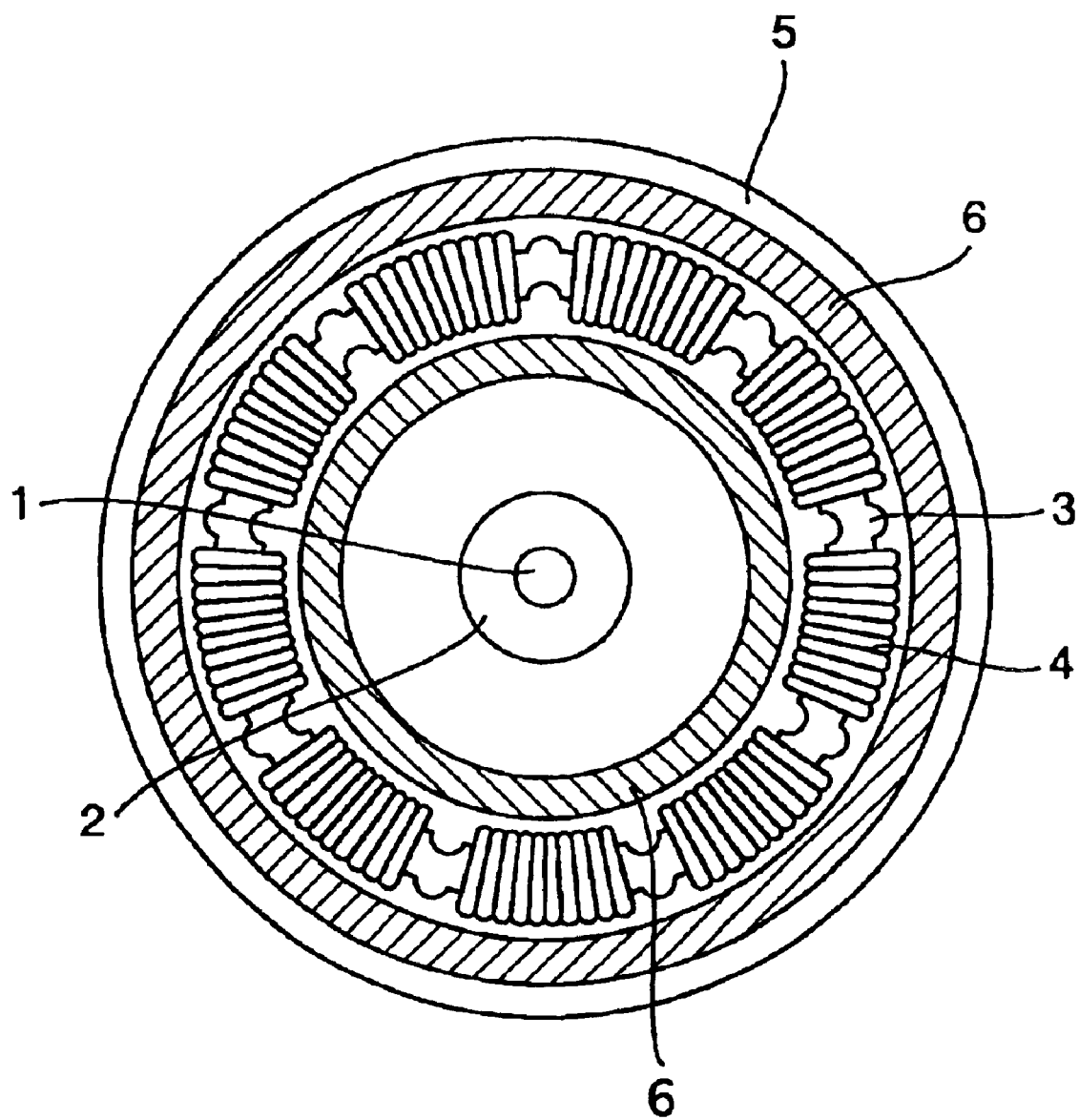
FIG. 15 is a schematic view of a structure in which magnets are arranged in inner and outer peripheries.

Further, FIG. 15 is a view showing a structure in which the magnets are arranged in inner and outer peripheries. A point different from the structure shown in FIGS. 1 and 6 exists in a structure in which the magnets 6 are arranged in both sides of the inner periphery and the outer periphery, and the back yoke 3 and the coil 4 are arranged so as to be held between the both magnets 6. In accordance with the structure mentioned above, since the electromagnetic force is applied to the coil 4 from both of the inner periphery and the outer periphery, it is possible to generate a stronger torque.

Figure 16:
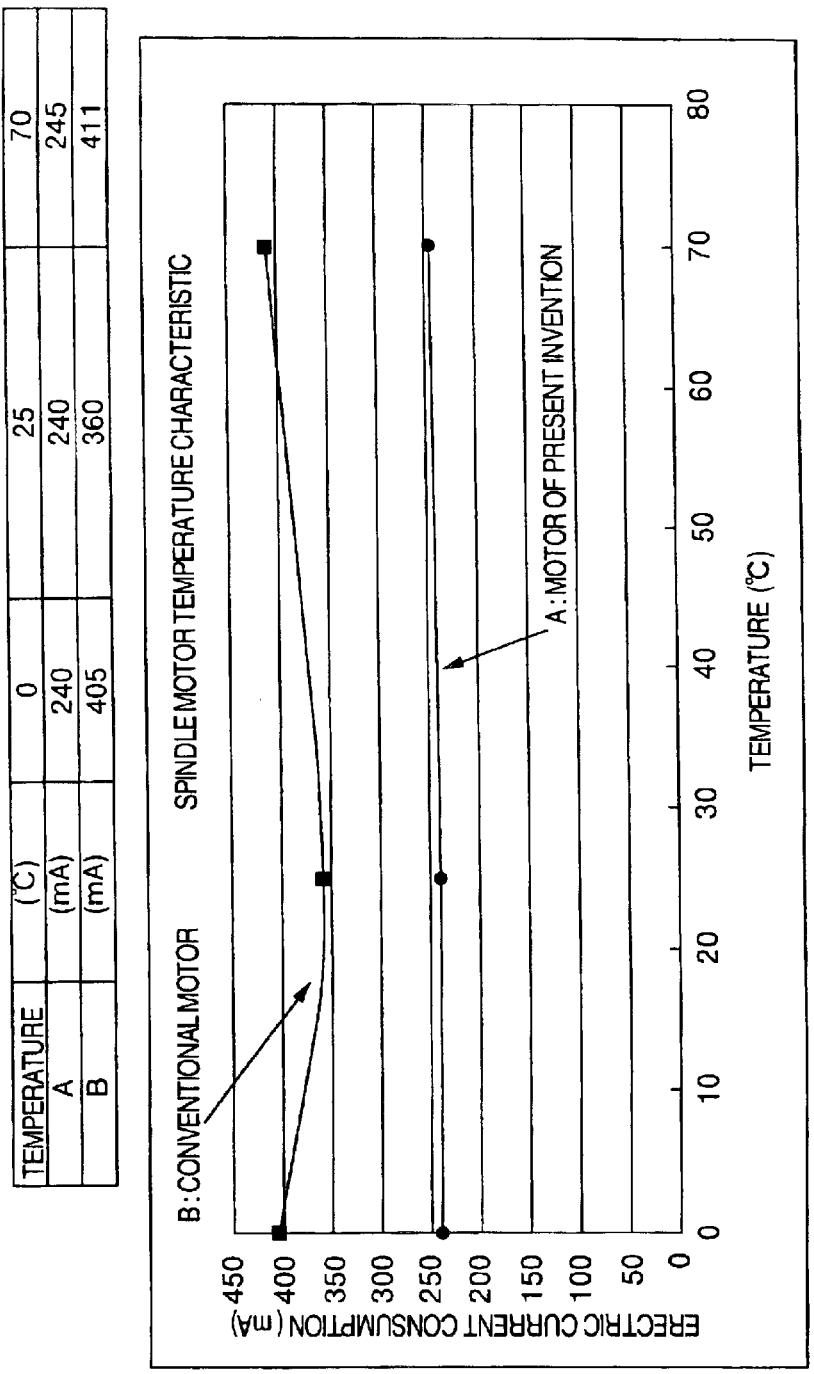
FIG. 16 is a view showing an estimate of a temperature characteristic.
Figure 17:
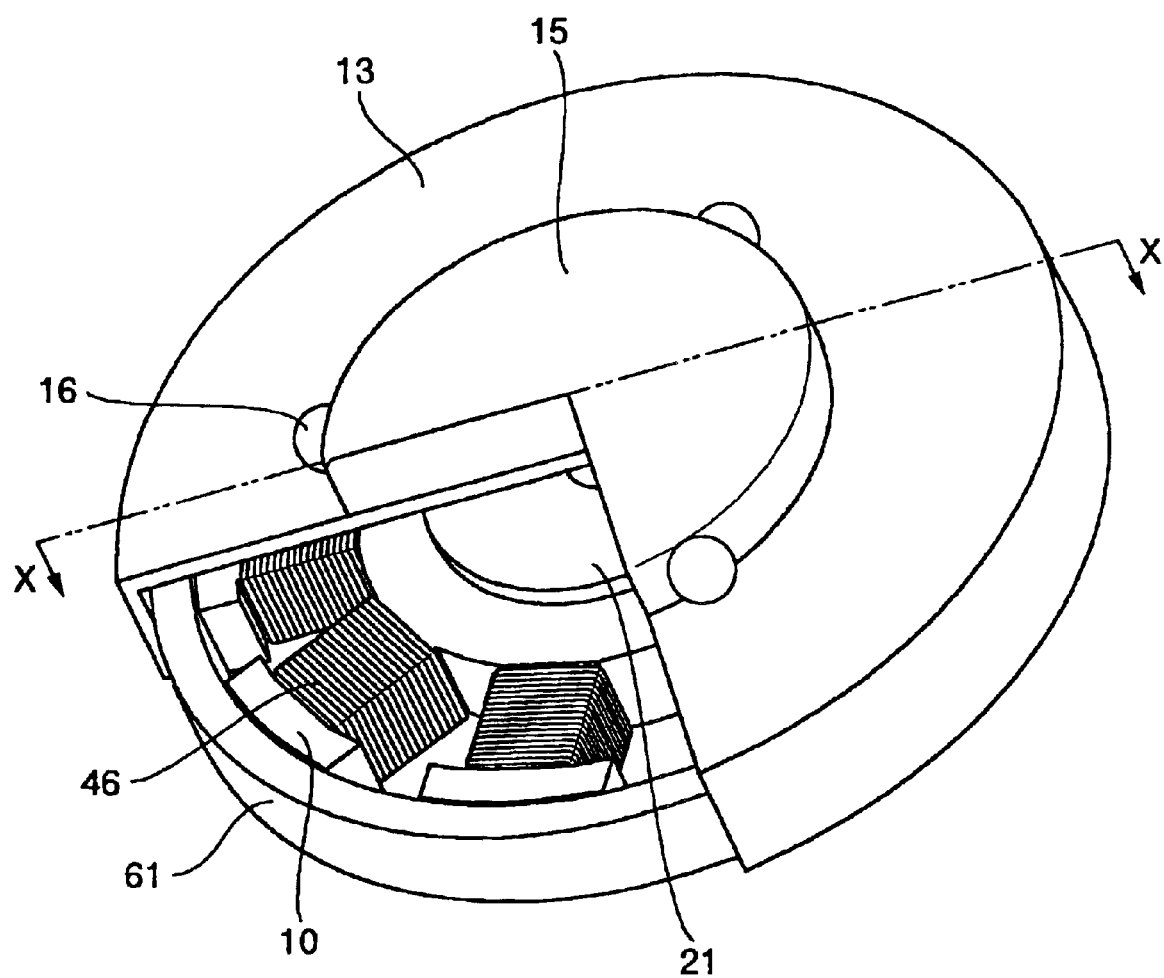
FIG. 17 is a perspective view of a conventional radial gap motor.
Figure 18:
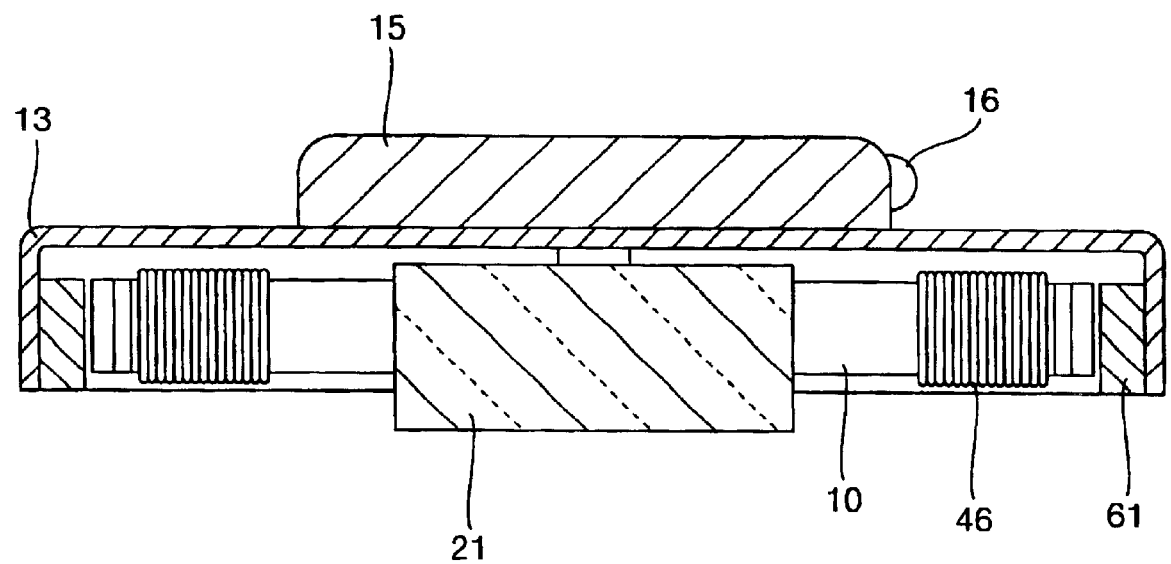
FIG. 18 is a cross sectional view along a line X—X in FIG. 14.
Figure 19:
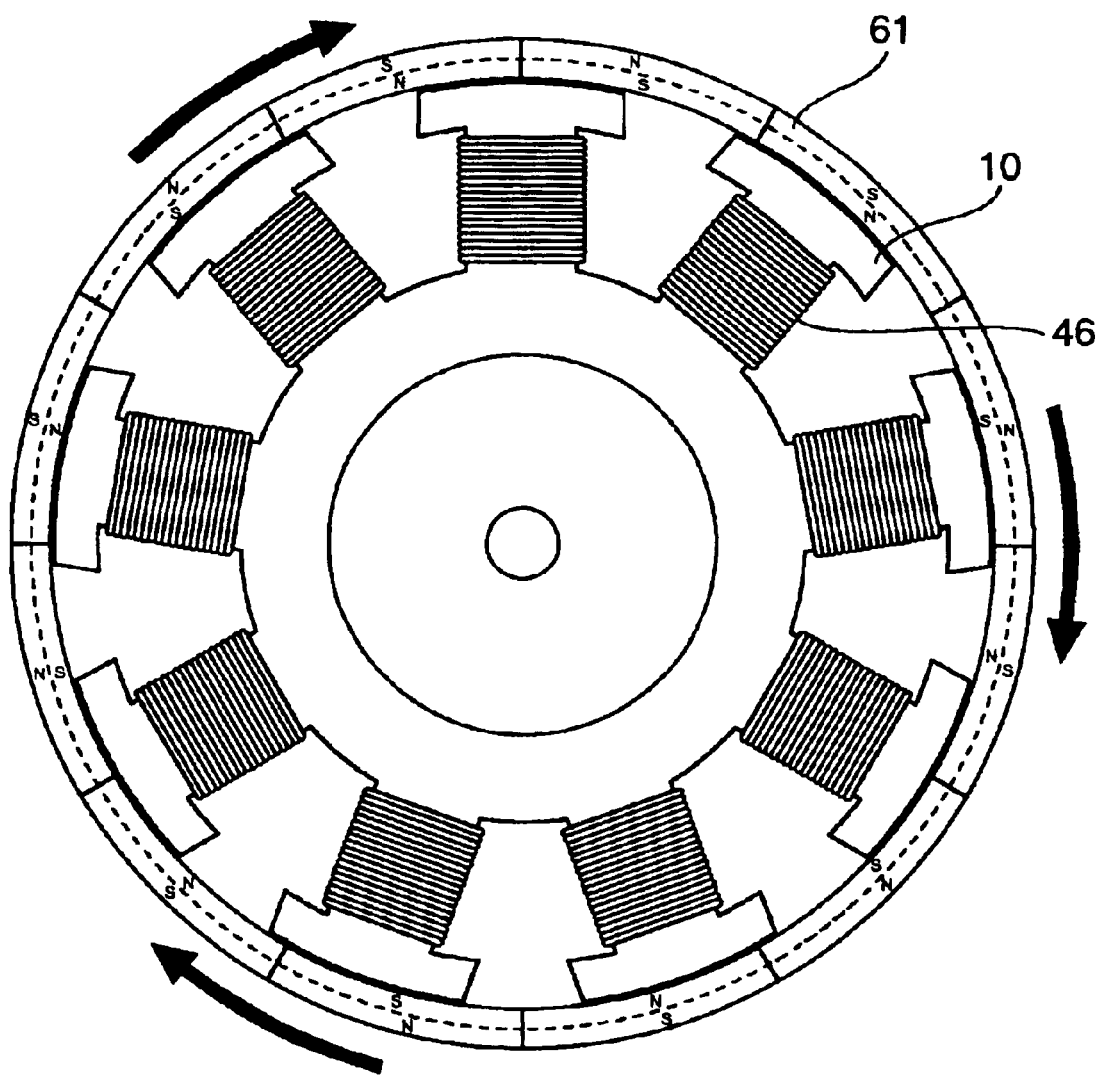
FIG. 19 is a schematic view describing a rotating operation of the structure shown in FIG. 14.
Figure 20:
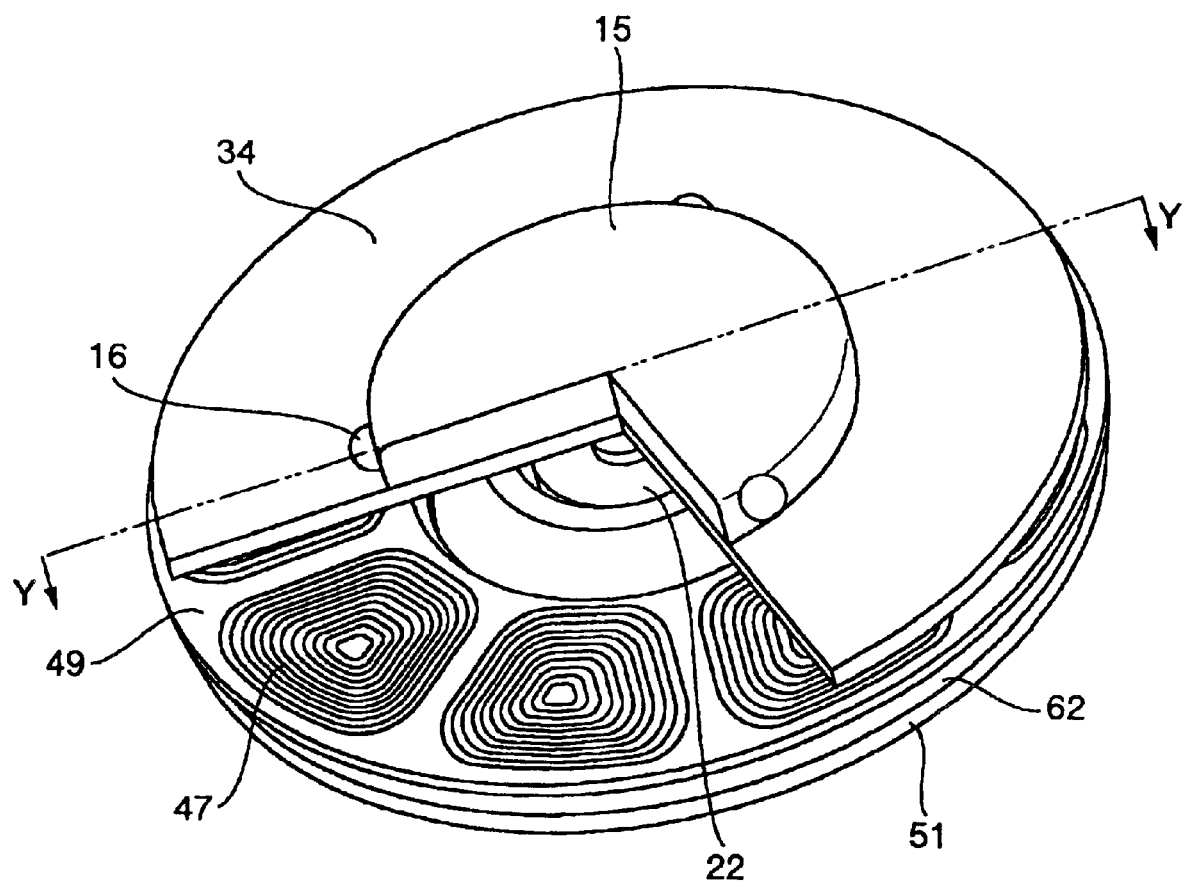
FIG. 20 is a perspective view of a conventional axial gap motor.
Figure 21:
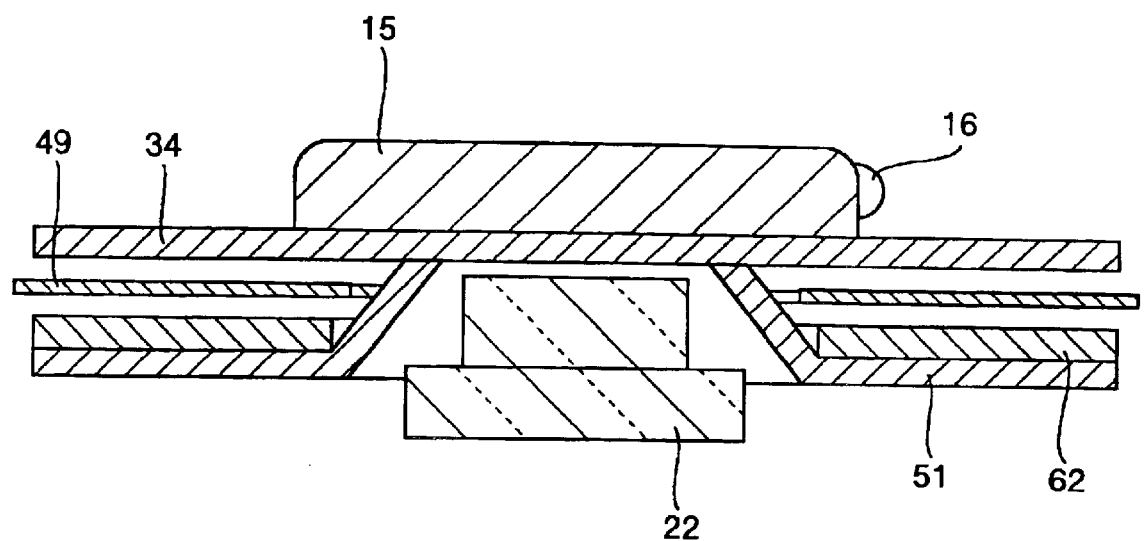
FIG. 21 is a cross sectional view along a line Y—Y in FIG. 17.
Figure 22:
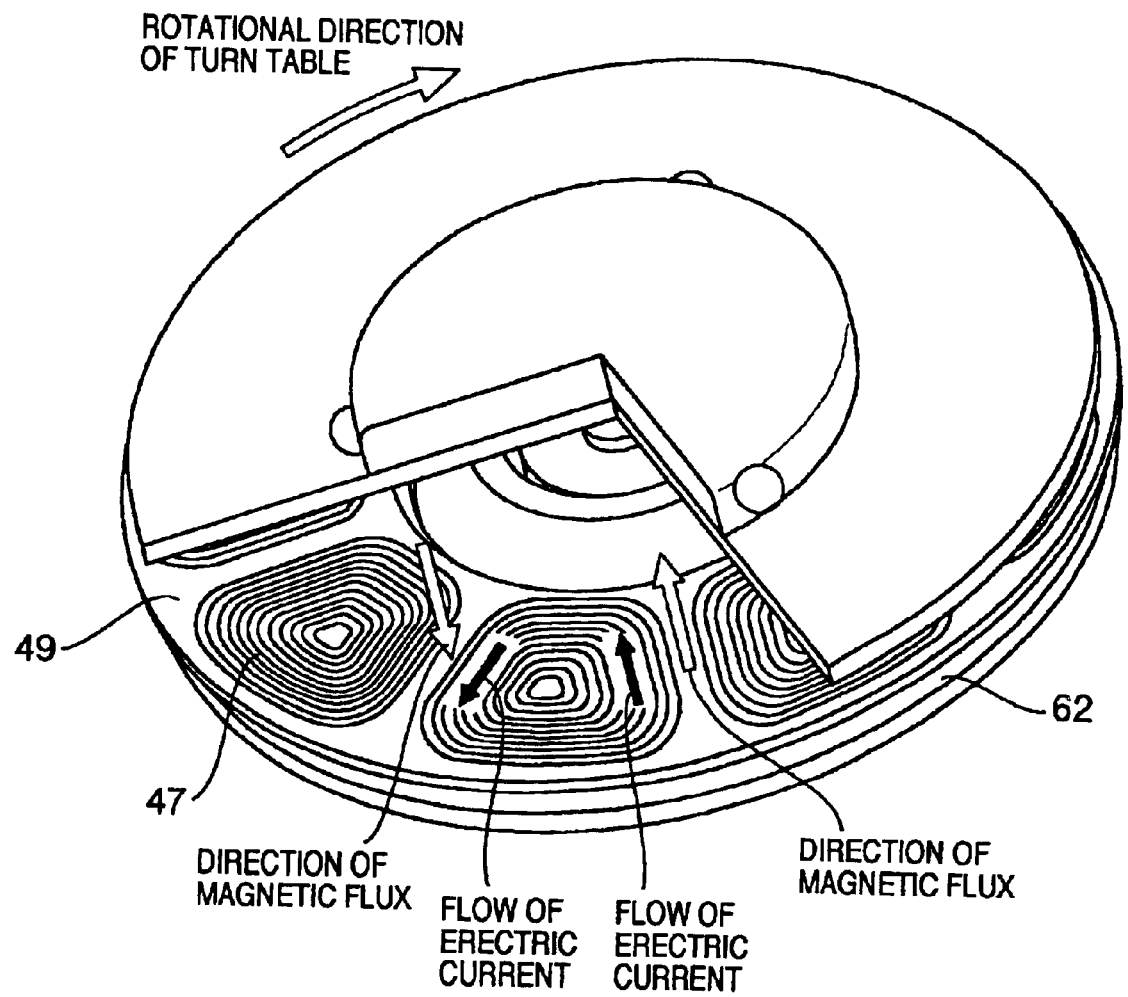
FIG. 22 is a schematic view describing a rotating operation of the structure shown in FIG. 17.
Figure 23:
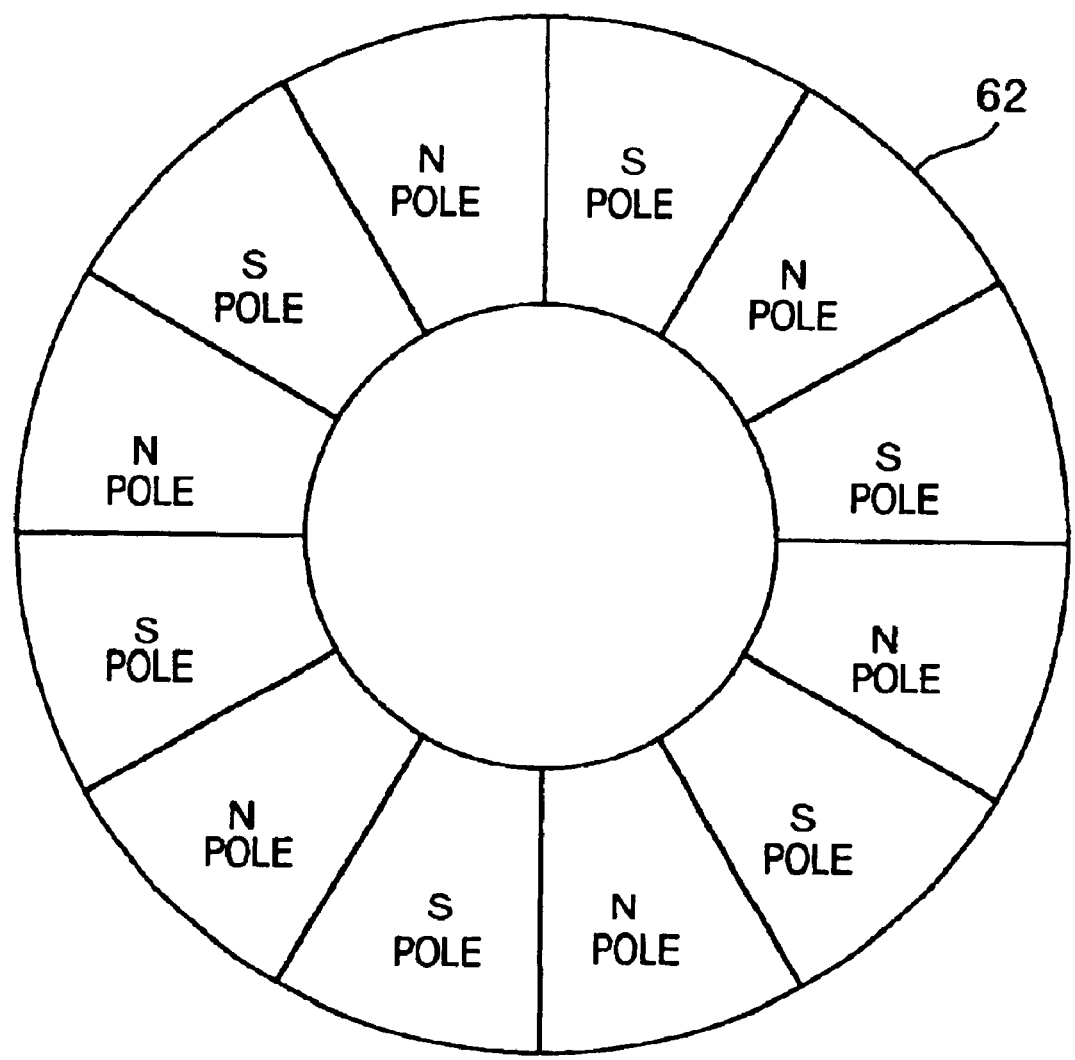
FIG. 23 is a view of a magnetization distribution of a magnet shown in FIG. 17.

Further, FIG. 16 is a view showing an estimate of a temperature characteristic. In FIG. 16, there is shown a motor electric current consumption at a time of attaching a standard disc having a diameter 12 cm to the motor so as to rotate. A motor for a comparison is the motor described in FIG. 17 in accordance with the prior art. Of course, the drive apparatus for driving the motor is set to the same condition. As illustrated in the drawing, the motor having the structure in accordance with the present invention has substantially a fixed electric current consumption (240 mA) in a range between 0° C. and 70° C. and does not show a change. On the contrary, the conventional motor shows an increase of 14.2% from 360 (mA) to 411 (mA).

The excellent temperature characteristic as mentioned above can be obtained because the motor having the structure in accordance with the present invention has a significantly smaller gap length than that of the conventional motor and the gap length is substantially fixed all around the periphery of the rotor in the motor (is changed only in the convex portion mentioned above), whereby a permeance forming the magnetic circuit of the motor does not generate a change due to the temperature (in other words, the magnetic circuit of the motor does not include any element affected by the temperature).

Since the excellent temperature characteristic as mentioned above is provided, in the case of using the motor having the structure in accordance with the present invention in the disc apparatus, a stable long time operation can be secured even when a battery capacity of the disc apparatus (for example, a lap top type computer) is reduced at a time of a low temperature. Otherwise, even when the disc apparatus is used for a long time and the temperature of the inner portion is increased, a stable long time operation can be secured.

In this case, the description mentioned above is given of the embodiment of the revolving-field type outer rotor motor. However, the present invention is not limited to the revolving-field type outer rotor motor. Since it is not a main subject of the present invention whether the rotor is arranged in the inner periphery or in the outer periphery, but is only the arrangement in view of the structure, it is possible to make an inner rotor structure by making good use of the structure in accordance with the present invention. Further, it is also possible to arrange the magnetic field system portion in the fixed side and arrange the armature portion in the rotating side, in the same manner.

The motor in accordance with the present invention structured as mentioned above can generate a great torque. This is because it is possible to reduce the gap between the magnet and the back yoke in view of the structure, and it is possible to secure a high gap magnetic flux density. Further, in the same manner, in view of the structure, since the electromagnetic force for rotating the motor is generated near the outermost periphery of the rotor (the magnetic field system portion), it is possible to acquire a large moment (radius), so that it is possible to increase the motor torque. Further, since the structure is made in the coil, it is possible to form in a lot of coils. Further, since the cylindrical magnet is arranged on the outer periphery and the number of the magnetized poles can be increased, it is possible to improve a torque constant and it is possible to increase the motor torque. Accordingly, if the load is in the same level, it is possible to realize a motor having a lower electric power consumption.

Further, since the motor having the structure in accordance with the present invention can be formed as a rigid body due to a mechanical fixation of the coil to the back yoke, the coil is hard to be vibrated. Further, since the magnetic flux generated in the back yoke is directly applied to the coil, it is possible to increase the torque generated in the motor and at the same time execute a quick accelerating operation. If the motor having the features mentioned above is used in the disc apparatus, it is possible to reduce an access time and an electric power consumption, and it is possible to structure the disc apparatus so as to have a thin thickness.

In this case, the embodiment used in the description is not used for construing that the present invention is limited to the usage of the spindle motor. For example, it is possible to extend the revolving field and the armature of the motor in the structure in accordance with the present invention in a direction of the rotary shaft, and accordingly, it is possible to realize the motor having a high torque, a small inertia and a low electric power consumption in spite of a small motor diameter.

As in detail described above, in accordance with the present invention, it is possible to provide the motor having a low electric power consumption, a high efficiency, a reduced change of the electric power consumption with respect to the temperature change, and a thin structure.

What is claimed is:

1. A motor comprising:
   an armature having an armature yoke formed in a cylindrical shape and an armature coil wound around a cylindrical circumferential surface of said armature yoke; and
   a cylindrical magnetic field system formed in a cylindrical shape and magnetized by a plurality of magnetic poles on the cylindrical circumferential surface, wherein:
   said armature yoke forms a convex portion protruding from said armature yoke toward said cylindrical magnetic field system in a current switching portion of said armature coil, and a recess portion is formed on a back surface of said armature yoke corresponding to said convex portion, and
   said armature coil is closely wound around the cylindrical surface of said armature yoke where the convex portion and the recess portion of said armature yoke do not exist.

2. A motor comprising:
   an armature having an armature yoke formed in a cylindrical shape and an armature coil wound around a cylindrical circumferential surface of said armature yoke; and
   a cylindrical magnetic field system formed in a cylindrical shape and magnetized by a plurality of magnetic poles on the cylindrical circumferential surface, wherein:
   said armature yoke forms a convex portion protruding from said armature yoke toward said cylindrical magnetic field system, and a recess portion is formed on a back surface of said armature yoke corresponding to said convex portion, said armature coil is constituted by one group of armature coils formed by winding two coils around both sides of said convex portion and connecting an end of one of the two coils wound on one side to an end of the other of the two coils that is wound on the other side of said convex portion.

3. A motor as claimed in claim 2, wherein said armature coil is closely wound around the cylindrical surface of said armature yoke where the convex portion and the recess portion of said armature yoke do not exist.

4. A motor as claimed in claim 2, wherein a gap between said armature yoke and said cylindrical magnetic field system is arranged at a predetermined interval, and said gap is set to a range between 1.0 and 1.5 (mm).

5. A motor as claimed in claim 2, wherein an angle of said convex portion is set to a range between 2 and 8 degrees.

6. A motor as claimed in claim 2, wherein a height of said convex portion is set to a range between 0.1 and 0.5 (mm).

7. A motor as claimed in claim 2, wherein said cylindrical magnetic field system is arranged in an outer periphery of said armature yoke, and a second cylindrical magnetic field system is arranged in an inner periphery of said armature yoke.

8. A motor comprising:
   an armature having an armature yoke formed in a cylindrical shape and an armature coil wound around a cylindrical circumferential surface of said armature yoke; and
   a cylindrical magnetic field system formed in a cylindrical shape and magnetized by a plurality of magnetic poles on the cylindrical circumferential surface, wherein
   said armature yoke forms a convex portion protruding from said armature yoke toward said cylindrical magnetic field system, a recess portion is formed on a back surface of said armature yoke corresponding to said convex portion, and an engaging portion for engaging the armature coil is formed in said convex portion, respectively, and wherein
   said armature coil engages a previously formed center portion with said engaging portion so as to wind around both sides of said convex portion.

9. A motor as claimed in claim 8, wherein said armature coil is closely wound around the cylindrical surface of said armature yoke where the convex portion and the recess portion of said armature yoke do not exist.

10. A motor as claimed in claim 8, wherein a gap between said armature yoke and said cylindrical magnetic field system is arranged at a predetermined interval, and said gap is set to a range between 1.0 and 1.5 (mm).

11. A motor as claimed in claim 8 wherein an angle of said convex portion is set to a range between 2 and 8 degrees.

12. A motor as claimed in claim 8, wherein a height of said convex portion is set to a range between 0.1 and 0.5 (mm).

13. A motor as claimed in claim 8, wherein said cylindrical magnetic field system is arranged in an outer periphery of said armature yoke, and a second cylindrical magnetic field system is arranged in an inner periphery of said armature yoke.

14. A disc apparatus rotating a medium by a motor, wherein said motor comprises:

an armature having an armature yoke formed in a cylindrical shape and an armature coil wound around a cylindrical circumferential surface of said armature yoke; and a cylindrical magnetic field system formed in a cylindrical shape and magnetized by a plurality of magnetic poles on the cylindrical circumferential surface, and in said motor, said armature yoke forms a convex portion protruding from said armature yoke toward said cylindrical magnetic field system, and a recess portion is formed on a back surface of said armature yoke corresponding to said convex portion, said armature coil is constituted by one group of armature coils formed by winding two coils around both sides of said convex portion and connecting an end of one of the two coils wound on one side to an end of the other of the two coils that is wound on the other side of said convex portion.

15. A disc apparatus rotating a medium by a motor, wherein said motor comprises:

an armature having an armature yoke formed in a cylindrical shape and an armature coil wound around a cylindrical circumferential surface of said armature yoke; and a cylindrical magnetic field system formed in a cylindrical shape and magnetized by a plurality of magnetic poles on the cylindrical circumferential surface, and in said motor, said armature yoke forms a convex portion protruding from said armature yoke toward said cylindrical magnetic field system, a recess portion is formed on a back surface of said armature yoke corresponding to said convex portion, and an engaging portion for engaging the armature coil is formed in said convex portion, respectively, and wherein said armature coil engages a previously formed center portion with said engaging portion so as to wind around both sides of said convex portion.

* * * * *